US010318599B2

(12) United States Patent
Glover et al.

(10) Patent No.: US 10,318,599 B2
(45) Date of Patent: Jun. 11, 2019

(54) PROVIDING ADDITIONAL FUNCTIONALITY AS ADVERTISEMENTS WITH SEARCH RESULTS

(71) Applicant: Samsung Electronics Co., Ltd., Suson-si, Gyeonggi-do (KR)

(72) Inventors: Eric J. Glover, Palo Alto, CA (US); David Hytha, Oakland, CA (US); Michael Travers, Pacifica, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 395 days.

(21) Appl. No.: 14/951,972

(22) Filed: Nov. 25, 2015

(65) Prior Publication Data
US 2016/0148262 A1 May 26, 2016

Related U.S. Application Data

(60) Provisional application No. 62/094,396, filed on Dec. 19, 2014, provisional application No. 62/084,686, filed on Nov. 26, 2014.

(51) Int. Cl.
*G06Q 30/00* (2012.01)
*G06F 16/9535* (2019.01)
*G06Q 30/02* (2012.01)

(52) U.S. Cl.
CPC ..... *G06F 16/9535* (2019.01); *G06Q 30/0251* (2013.01); *G06Q 30/0256* (2013.01);
(Continued)

(58) Field of Classification Search
USPC ...................... 705/14.49, 14.54, 14.64, 14.72
See application file for complete search history.

(56) References Cited

U.S. PATENT DOCUMENTS 5,717,923 A * 2/1998 Dedrick ............. G06Q 30/0253
5,848,396 A * 12/1998 Gerace .................. G06Q 30/02
705/7.33

(Continued)

OTHER PUBLICATIONS

David Jingjun Xu, et al., "Combining Empirical Experimentation and Modeling Techniques: A design research approach for personalized mobile advertising applications." ElSevier, 2007. (Year: 2007).*

(Continued)

*Primary Examiner* — Luis A Brown
(74) *Attorney, Agent, or Firm* — Jefferson IP Law, LLP

(57) ABSTRACT

A method includes receiving advertisement data from a plurality of advertiser devices and generating advertisement records in a data store based on the advertisement data. Each of the advertisement records includes an entity name associated with an advertisement, an action associated with the advertisement, and a bid price. The method further includes receiving an advertisement request from a search system, the advertisement request including an entity name and an action associated with an application state included in a set of search results generated by the search system. Additionally, the method includes selecting an advertisement record having the entity name indicated in the advertisement request and having a different action than the action indicated in the advertisement request, generating an advertisement result based on the selected advertisement record, and transmitting the advertisement result to the search system. The advertisement result is configured to be included in a search result.

18 Claims, 20 Drawing Sheets

(52) U.S. Cl.
CPC ..... *G06Q 30/0267* (2013.01); *G06Q 30/0275* (2013.01); *G06Q 30/0276* (2013.01)

(56) References Cited

U.S. PATENT DOCUMENTS

| | | | | |
|---|---|---|---|---|
| 5,991,735 | A * | 11/1999 | Gerace | G06Q 30/02 705/7.29 |
| 7,853,700 | B2 * | 12/2010 | Lee | G06Q 30/02 705/7.29 |
| 7,962,604 | B1 * | 6/2011 | Morris | G06Q 30/02 705/14.4 |
| 8,321,534 | B1 * | 11/2012 | Roskind | H04N 21/25808 348/194 |
| 8,666,811 | B1 * | 3/2014 | Chen | G06Q 30/00 705/14.26 |
| 2001/0029525 | A1 * | 10/2001 | Lahr | G06F 16/9566 709/218 |
| 2002/0042738 | A1 * | 4/2002 | Srinivasan | G06Q 30/02 705/14.43 |
| 2003/0106022 | A1 * | 6/2003 | Goodacre | H04M 1/72525 715/226 |
| 2005/0096979 | A1 * | 5/2005 | Koningstein | G06Q 10/10 705/14.68 |
| 2005/0096980 | A1 * | 5/2005 | Koningstein | G06Q 30/00 705/14.41 |
| 2005/0235048 | A1 * | 10/2005 | Costa-Requena | H04L 29/06027 709/219 |
| 2006/0074769 | A1 * | 4/2006 | Looney | G06Q 30/02 705/14.66 |
| 2006/0149624 | A1 * | 7/2006 | Baluja | G06Q 30/0255 705/14.53 |
| 2006/0271438 | A1 * | 11/2006 | Shotland | G06Q 30/02 705/14.46 |
| 2007/0022442 | A1 * | 1/2007 | Gil | G06Q 30/02 725/62 |
| 2007/0100650 | A1 | 5/2007 | Ramer et al. | |
| 2007/0300152 | A1 * | 12/2007 | Baugher | G06Q 30/0243 715/210 |
| 2008/0092159 | A1 * | 4/2008 | Dmitriev | G06Q 30/0269 725/34 |
| 2008/0155588 | A1 * | 6/2008 | Roberts | G06Q 30/00 725/34 |
| 2010/0036717 | A1 * | 2/2010 | Trest | G06Q 30/0207 705/14.1 |
| 2010/0070373 | A1 * | 3/2010 | Zoeter | G06Q 30/02 705/14.71 |
| 2010/0222040 | A1 * | 9/2010 | Bosan | G06Q 30/02 455/414.1 |
| 2011/0072374 | A1 | 3/2011 | Kunz et al. | |
| 2011/0307482 | A1 | 12/2011 | Radlinski et al. | |
| 2012/0278722 | A1 * | 11/2012 | Raleigh | H04L 12/14 715/735 |
| 2012/0289147 | A1 * | 11/2012 | Raleigh | H04L 67/2847 455/3.06 |
| 2013/0018731 | A1 * | 1/2013 | Morris | G06Q 30/02 705/14.66 |
| 2013/0311285 | A1 * | 11/2013 | Abrol | G06F 16/951 705/14.54 |
| 2013/0337785 | A1 * | 12/2013 | Delug | H04W 4/60 455/414.1 |
| 2014/0172563 | A1 * | 6/2014 | Amit | G06Q 50/01 705/14.54 |
| 2014/0172840 | A1 | 6/2014 | Kumar et al. | |
| 2014/0236386 | A1 * | 8/2014 | Yoshizawa | B60W 30/08 701/1 |
| 2014/0250106 | A1 * | 9/2014 | Shapira | G06F 3/04842 707/722 |
| 2014/0258013 | A1 * | 9/2014 | Collins | G06Q 30/0625 705/26.3 |
| 2014/0258014 | A1 * | 9/2014 | Collins | G06Q 30/0241 705/26.3 |
| 2014/0316890 | A1 * | 10/2014 | Kagan | G06Q 30/0256 705/14.54 |
| 2014/0344073 | A1 * | 11/2014 | Yan | G06Q 30/0275 705/14.71 |
| 2015/0095160 | A1 * | 4/2015 | Ma | G06Q 30/0267 705/14.64 |
| 2015/0134436 | A1 * | 5/2015 | Lambert | G06Q 30/00 705/14.26 |
| 2015/0161149 | A1 * | 6/2015 | Genera | G06F 16/9537 707/711 |
| 2015/0193546 | A1 * | 7/2015 | Lipton | G06F 9/445 717/178 |
| 2015/0227633 | A1 * | 8/2015 | Shapira | G06F 16/2425 707/706 |
| 2015/0254367 | A1 * | 9/2015 | Kagan | G06F 16/248 707/706 |
| 2015/0371263 | A1 * | 12/2015 | Kagan | G06F 16/9535 705/14.54 |
| 2016/0034957 | A1 * | 2/2016 | Kagan | G06F 16/9535 705/14.54 |
| 2016/0063535 | A1 * | 3/2016 | Xu | G06Q 30/0241 705/14.4 |
| 2016/0085521 | A1 * | 3/2016 | Savliwala | G06F 16/22 717/108 |
| 2016/0092919 | A1 * | 3/2016 | Coleman, Jr. | G06Q 30/0255 705/14.53 |
| 2016/0148262 | A1 * | 5/2016 | Glover | G06F 16/9535 705/14.54 |
| 2016/0162555 | A1 * | 6/2016 | Shapira | G06F 16/248 707/722 |
| 2016/0313893 | A1 * | 10/2016 | Xu | G06F 3/0481 |
| 2017/0140421 | A1 * | 5/2017 | Filev | G06Q 30/02 |
| 2017/0178038 | A1 * | 6/2017 | Guven | G06Q 10/0635 |

OTHER PUBLICATIONS

Alok Tongaonkar, et al., "Understanding Mobile App Usage Patterns Using In-App Advertisements." International Conference on Passive and Active Network Measurement, pp. 63-72, 2013. (Year: 2013).*

International Search Report and Written Opinion for related WO Application No. PCT/US2015/066593, dated Apr. 11, 2016.

* cited by examiner

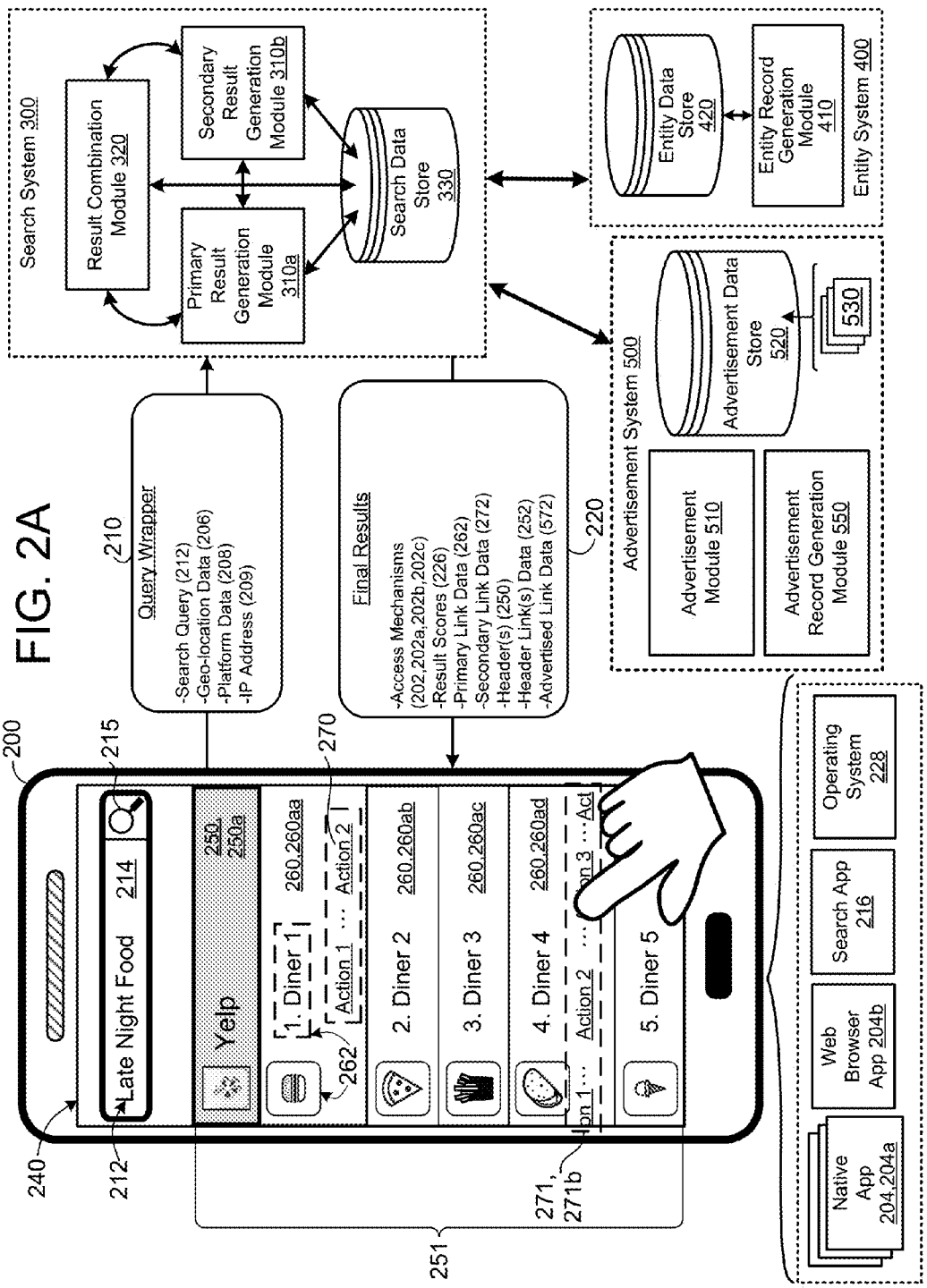

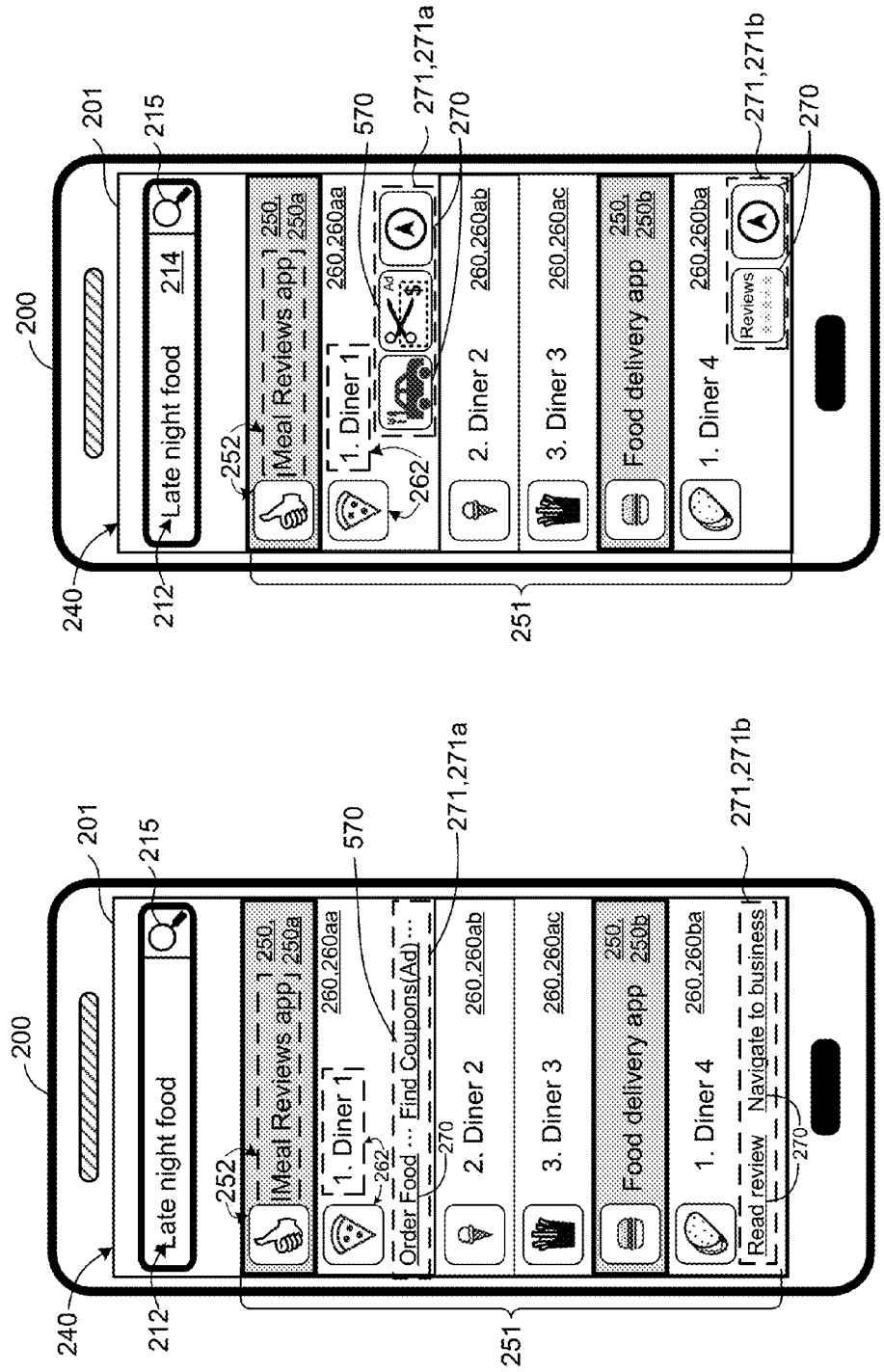

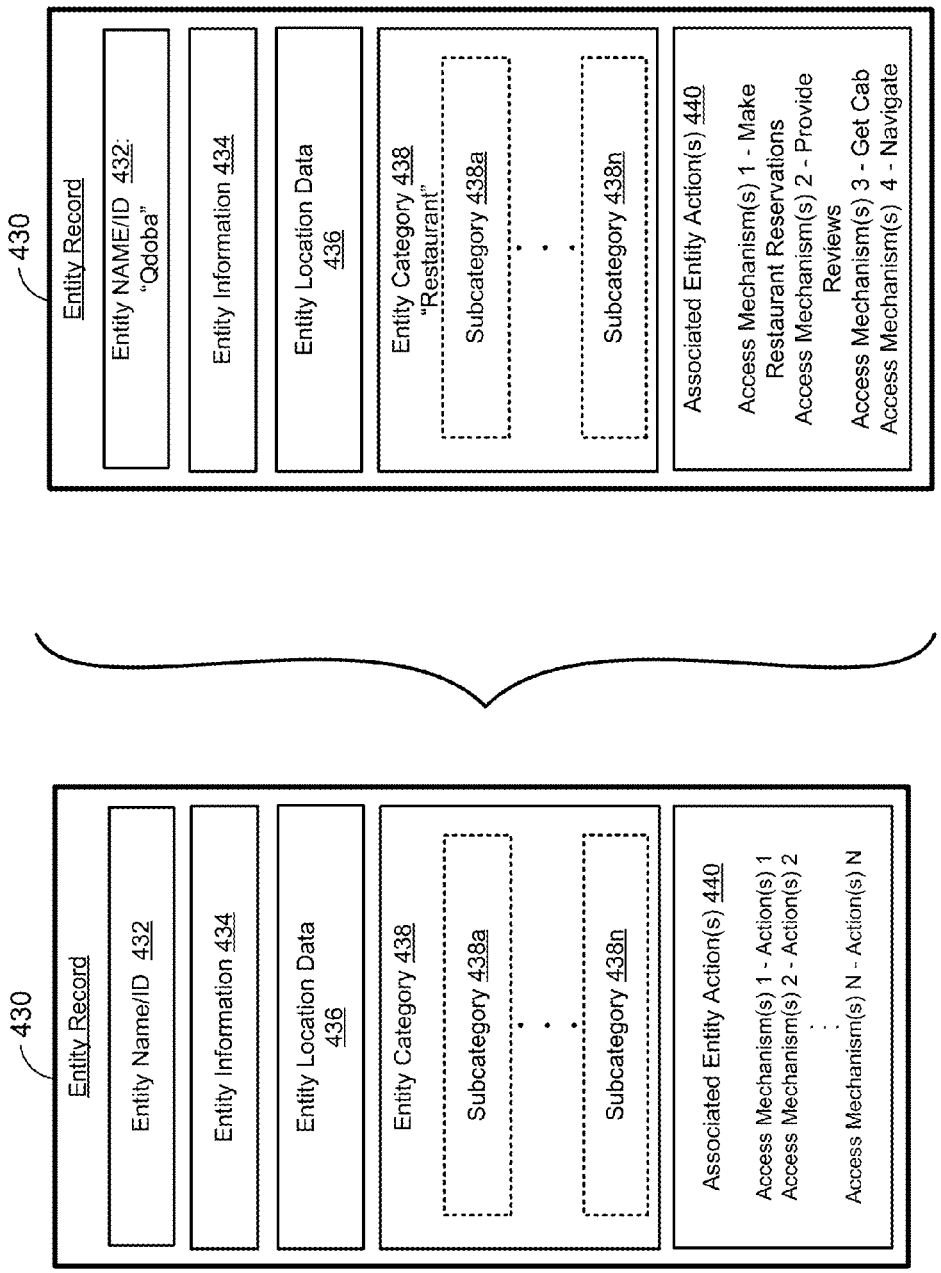

PROVIDING ADDITIONAL FUNCTIONALITY AS ADVERTISEMENTS WITH SEARCH RESULTS

CROSS REFERENCE TO RELATED APPLICATIONS

This U.S. patent application claims priority under 35 U.S.C. § 119(e) to U.S. Provisional Application 62/084,686, filed on Nov. 26, 2014, and U.S. Provisional Application 62/094,396, filed on Dec. 19, 2014. The disclosures of these prior applications are considered part of the disclosure of this application and are hereby incorporated by reference in their entireties.

TECHNICAL FIELD

This disclosure relates to generating advertisements that connect a user to native and web application functionality.

BACKGROUND

In recent years, use of computers, smartphones, and other Internet-connected devices has grown exponentially. Correspondingly, the number of available software applications for such devices has also grown. Today, many diverse native and web software applications can be accessed on any number of different devices, including, but not limited to, smartphones, personal computers, automobiles, and televisions. These diverse applications can range from business driven applications to games, educational applications, news applications, shopping applications, messaging applications, media streaming applications, social networking applications, and so more. Furthermore, application developers develop vast amounts of applications within each genre and each application may have numerous editions. As a result, users of Internet-connected devices have encountered the problem of finding the correct native or web software application offering the information and/or functionality that they seek. In response to this problem, techniques have arisen to connect users of these devices to relevant application and web content.

SUMMARY

The details of one or more implementations of the disclosure are set forth in the accompanying drawings and the description below. Other aspects, features, and advantages will be apparent from the description and drawings, and from the claims.

In one example, the present disclosure is directed to a method comprising receiving, at a computing device including one or more processing units, advertisement data from a plurality of advertiser devices. The method further comprises generating a plurality of advertisement records in an advertisement data store based on the advertisement data received from the plurality of advertiser devices. Each of the advertisement records includes an entity name associated with an advertisement, an action associated with the advertisement, and a bid price indicating an amount of money associated with the advertisement. The method further comprises receiving an advertisement request from a search system, the advertisement request including an entity name and an action associated with an application state included in a set of search results generated by the search system. Additionally, the method comprises selecting an advertisement record having the entity name indicated in the advertisement request and having a different action than the action indicated in the advertisement request, generating an advertisement result based on the selected advertisement record, and transmitting the advertisement result to the search system. The advertisement result is configured to be included in a search result.

In another example, the present disclosure is directed to a system comprising one or more computing devices and a data store. The data store comprises one or more storage devices. The one or more computing devices include one or more processing units that execute computer-readable instructions, the computer readable instructions, when executed by the one or more processing units, cause the one or more computing devices to receive advertisement data from a plurality of advertiser devices and generate a plurality of advertisement records in the data store based on the advertisement data received from the plurality of advertiser devices. Each of the advertisement records includes an entity name associated with an advertisement, an action associated with the advertisement, and a bid price indicating an amount of money associated with the advertisement. The one or more computing devices are further configured to receive an advertisement request from a search system, the advertisement request including an entity name and an action associated with an application state included in a set of search results generated by the search system. The one or more computing devices are further configured to select an advertisement record having the entity name indicated in the advertisement request and having a different action than the action indicated in the advertisement request, generate an advertisement result based on the selected advertisement record, and transmit the advertisement result to the search system. The advertisement result is configured to be included in a search result.

DESCRIPTION OF DRAWINGS

FIG. 2A is a schematic view of an example user device in communication with a search system.

FIGS. 3A-3C are schematic views of an example user device displaying results.

FIGS. 5A and 5B are schematic views of an example entity record.

Like reference symbols in the various drawings indicate like elements.

DETAILED DESCRIPTION

Figure 1A:
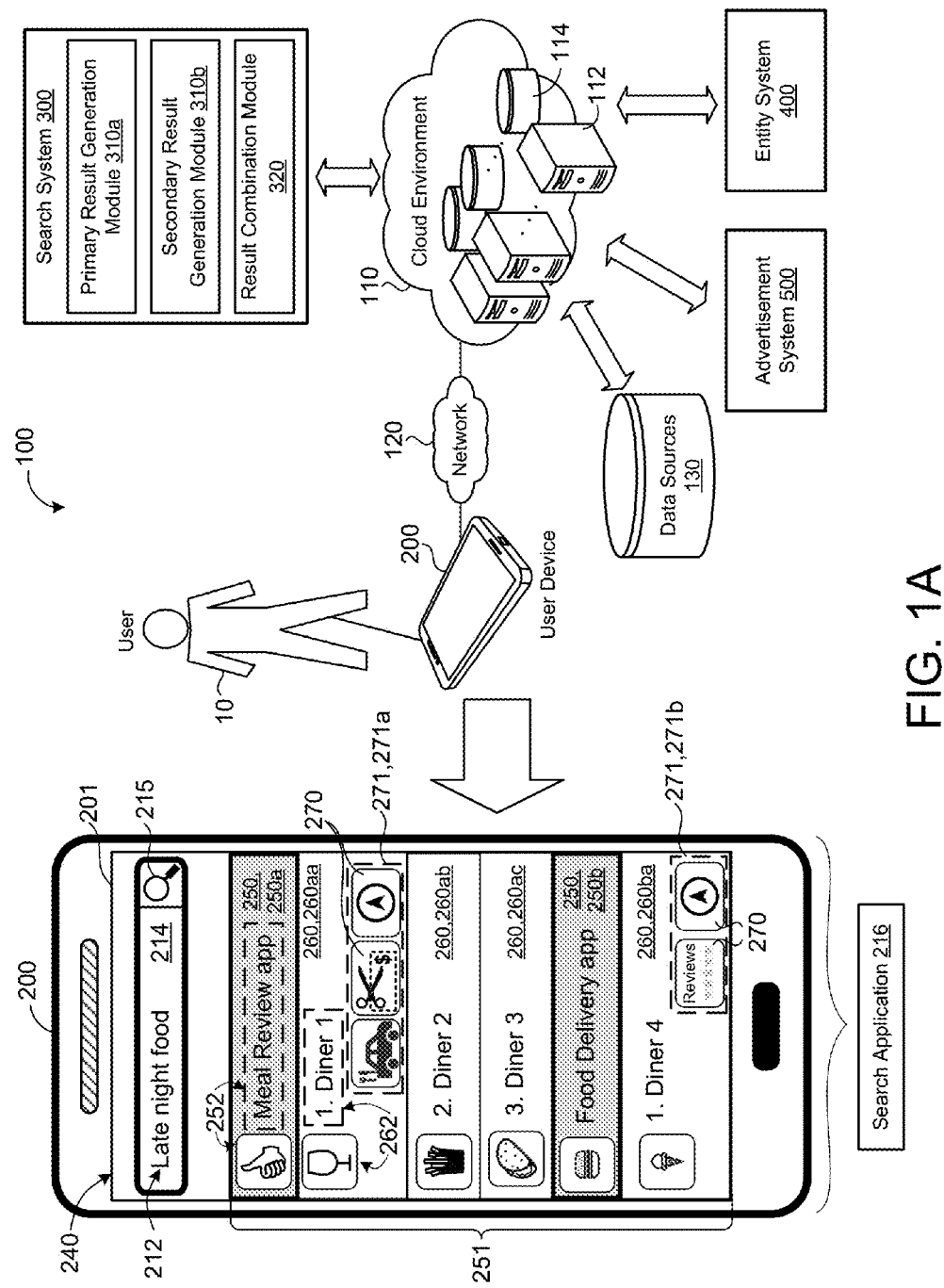
FIG. 1A is a schematic view of an example environment including a user device in communication with a search system, an entity system, and an advertisement system.

The figures and following description relate to example implementations by way of illustration only. It should be noted that from the following discussion, alternative implementations of structures and methods disclosed herein will be readily recognized as viable alternatives that may be employed without departing from the scope of the disclosure. This disclosure describes techniques for generating advertised user-selectable links to application states related to organically generated search results.

The present disclosure relates to enhancing an organic set of search results (referred to herein as "primary results") by providing user-selectable links to additional application states (referred to herein as "secondary results"). For example, one or more secondary results can be placed within or adjacent to each of the primary results. In some implementations, the secondary results can be advertised secondary results (referred to herein as "advertisement results").

A search system of the present disclosure generates a set of organic search results in response to a search query received from a user device. Each individual organic search result (i.e., each primary result) may be displayed as a user-selectable link to an application state associated with an entity (e.g., a person, place, or thing) and an action (e.g., functionality provided by the application state). The search system generates additional search results (i.e., secondary results) based on one or more of the primary results. The search system may include one or more user-selectable links to secondary results within a user-selectable link of a primary result to form a combined search result. FIG. 1D illustrates an example combined result appearing in a search engine results page (hereafter "SERP"). A combined result may include multiple user-selectable links. For example, the combined result appearing in FIG. 1D includes a link to a primary result (hereafter "primary link") and one or more links to secondary results (hereafter "secondary links"). In some implementations, the search system can leverage an advertisement system of the present disclosure to include advertisement results in the combined results. For example, with respect to FIG. 1D, a primary link 260 of a SERF includes advertised secondary links 570.

The search system may generate secondary results for a corresponding primary result by identifying application states that are associated with the same entity but different action than the application state of the primary result. For example, if the entity associated with a primary result is a restaurant, an action associated with the primary result may be "view menu." In this example, a secondary result displayed within the primary result may correspond to the same entity (i.e., the restaurant of the primary result), but associated with a different action than the primary result, such as "order for delivery." In some implementations, an advertisement result may be included in a combined search result. An advertisement result may be rendered and displayed as an advertised secondary link associated with the same entity as the primary link, but a different action than the primary link. Providing combined results, one or more of which may include an advertised secondary link, may allow the user to quickly access additional functionality that would not otherwise be available in a SERP. Additionally, providing advertised secondary links may also provide an advertiser an opportunity to promote their application functionality.

The search system of the present disclosure communicates with an advertisement system configured to provide advertisement results. The search system utilizes advertisement results to generate combined results that include advertised secondary links. The advertisement system generates advertisement results based on an advertisement request received from the search system. The advertisement system uses the information contained in the advertisement request to identify potential advertised secondary links (hereafter "potential advertisements") and generate corresponding advertisement results. The advertisement results include data and information that the search system can use to generate one or more combined results for display in a SERP. In some implementations, the advertisement system may select between potential advertisements based on settings and preferences indicated by their corresponding advertisement campaigns.

The advertisement system receives an advertisement request from the search system. The advertisement request may include an entity and an action of a primary result (hereafter "primary entity-action pair"). The advertisement system generates advertisement results that are associated with the same entity and different actions than those of the advertisement request. In some implementations, the search system selects a primary result, transmits an advertisement request to the advertisement system based on the primary result, and generates a combined result based on the (primary result and the received advertisement result(s). In other implementations, the search system generates secondary results and transmits an advertisement request based on a primary result and the generated secondary results. In this example, the advertisement results can indicate which of the generated secondary results present an advertisement opportunity (e.g., are associated with advertisement campaigns). In this example, the search system can create combined results based on the generated secondary results associated with advertisement campaigns. For example, the advertisement system can promote one or more of the secondary links as advertisements in a combined search result where the secondary links may not have otherwise been displayed without sponsorship. In other words, the advertisement system can promote advertised secondary links when there would otherwise have been other, non-advertised secondary links in the combined result.

In the case where there are more potential advertisements than requested by the search system, the advertisement system may select between potential advertisements based on a number of factors. In some examples, the advertisement system may select potential advertisements based on at least one of a likelihood that a user will click on a potential advertisement, an expected revenue from displaying a potential advertisement, a measure of relevance of a potential advertisement to a search query, and an amount an advertiser is willing to pay in exchange for displaying a potential advertisement. In other examples, the advertisement system may generate scores for the potential advertisements indicating the relevance or popularity of the potential advertisements. In examples where the advertisement system generates a score (e.g., a result score or a popularity score), the advertisement system may select the potential advertisements with the highest scores. In a different example, the advertisement system may select between available potential advertisements randomly.

An advertiser may communicate with the advertisement system (e.g., using a campaign manager of FIG. 1E) to manage and update the settings and preferences of an advertisement campaign. An advertisement campaign may detail the settings, preferences, and manner in which an advertiser's (e.g., a software application developer or third party hired to advertise an application) advertised secondary results should be selected and displayed. Examples of settings and preferences can include, but are not limited to, the amount of money and how a participating advertiser is willing to pay for their application state to be advertised (e.g., cost per impression, cost per click, or cost per action), the applications with which an advertiser may or may not want their advertised application state to appear alongside (e.g., a "whitelist" or "blacklist"), the geographic locations in which an advertiser wants their advertised application state to appear, a list of specific allowable (or disallowed) actions (e.g., an advertiser for a specific restaurant application may not want to include links to third party applications for the action "view food photos" but may allow links to third party applications for the action "make reservations"), and a number of other preferences and settings discussed herein.

Figure 1B:
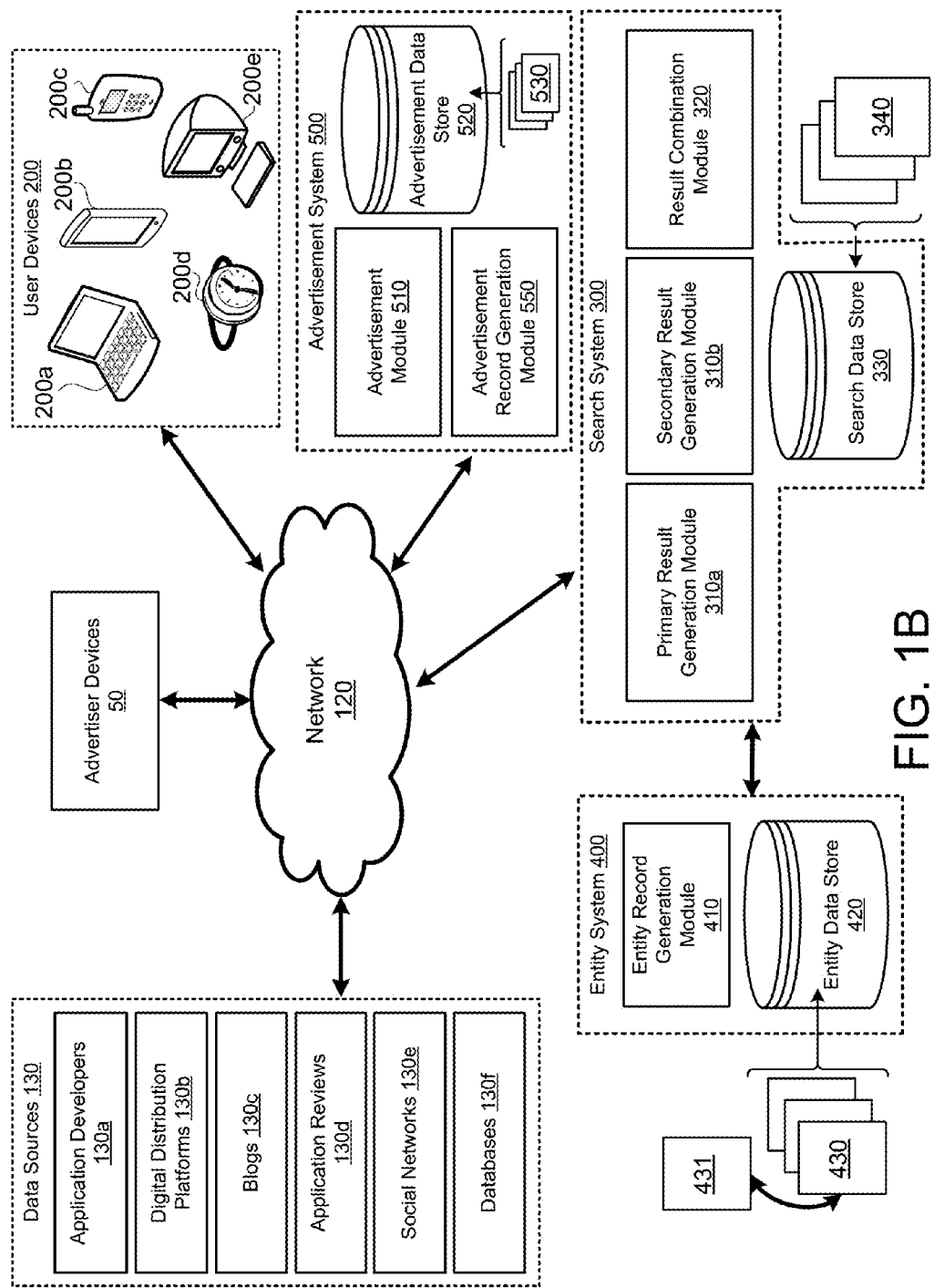
FIG. 1B is a functional block diagram of a search system interacting with an entity system, an advertisement system, user devices, and data sources.
Figure 1C:
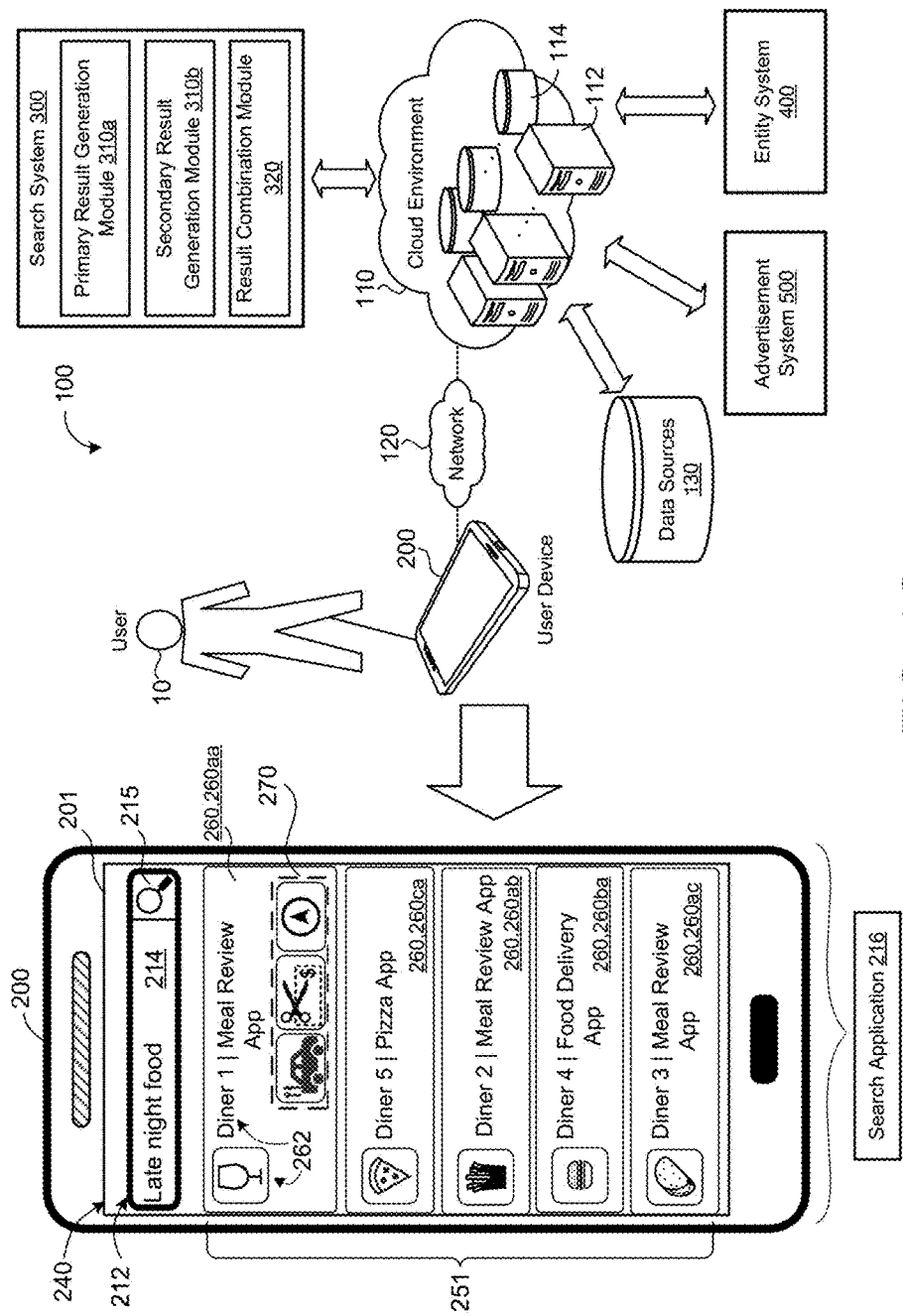
FIG. 1C is a schematic view of an example environment including a user device in communication with a search system, an entity system, and an advertisement system.
Figure 1D:
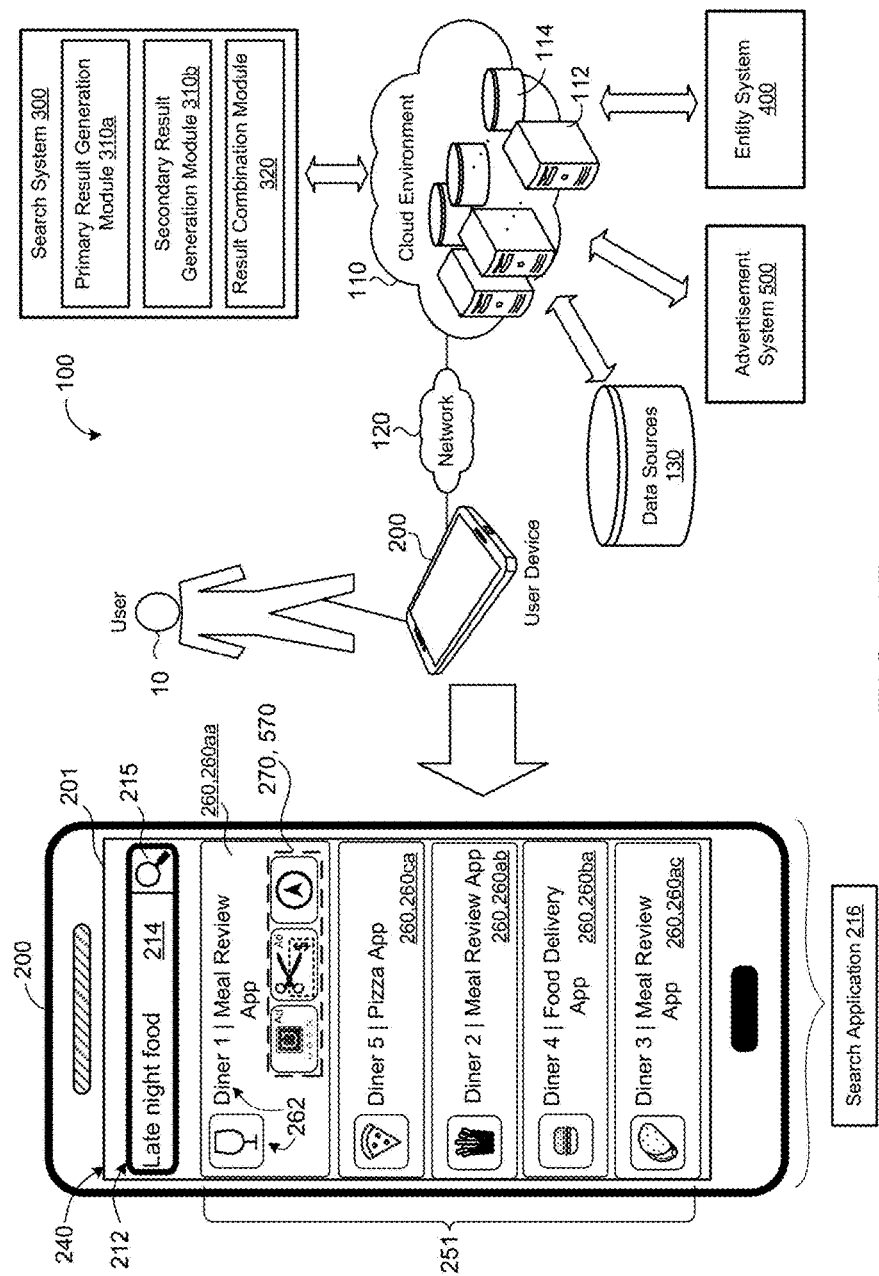
FIG. 1D is a schematic view of an example environment including a user device displaying advertised secondary links and in communication with a search system, an entity system, and an advertisement system.

FIGS. 1A, 1C, and 1D illustrate an environment 100 including a user device 200, a search system 300, an entity system 400, and an advertisement system 500. The search system 300 receives a query wrapper 210 including a search query 212 from a user device 200. The search system 300 can generate organic search results (i.e., primary results 222 of FIG. 2B) based on the search query 212 using a primary result generation module 310a. The search system 300 can additionally generate secondary results 224 based on one or more of the primary results 222 using the secondary result generation module 310b. For each individual primary result 222, the secondary result generation module 310b can access an entity system 400 to identify application states that are associated with the same entity but different action than the primary result 222. In this way, the secondary result generation module 310b generates secondary results 224 that are each associated with the same entity but different action than their corresponding primary result 222. The result combination module 320 generates final results 220 by combining secondary results 224 with primary results 222. For example, the result combination module can select which of the primary results 222 will be enhanced with secondary results 224, how many secondary results 224 to include within the selected primary results 222, and which secondary results 224 to include in the selected primary results 222. In this way, the result combination module 320 determines which of the primary and secondary results will be combined results. The search system 300 transmits the final results 220 including combined results to the requesting user device 200. The user device 200 renders and displays the final results 220 as user-selectable links in a SERP.

The result combination module 320 can transmit an advertisement request 512 to the advertisement system 500. The advertisement request 512 may include a number of requested advertisements, a primary entity-action pair, entity-action pairs associated with one or more secondary results 224 (hereafter "secondary entity-action pairs"), data describing the underlying applications of the primary results 222 and the one or more secondary results 224, along with other data. The advertisement module 510 generates advertisement results 522 in response to the advertisement request 512. The advertisement module 510 utilizes advertisement records 530 of the advertisement data store 520 to generate the advertisement results 522. The advertisement results 522 include data that allows the result combination module 320 to generate combined results that include advertised secondary links 570 (e.g., FIG. 1D). For example, the advertisement results 522 may include advertised secondary link data 572 that can be used to render and display an advertised secondary link 570. In another example, the advertisement results 522 may include indicators that notify the result combination module of which secondary results 224 present an advertisement opportunity (e.g., are associated with an advertisement campaign). In this example, the result combination module 320 may select the secondary results 224 that present an advertisement opportunity over those that do not for inclusion in a combined result. In this way, the result combination module 320 may include advertised secondary links 570 in the combined results of the final results 220.

In FIG. 1A a user 10 enters a query 212 (e.g., "Late night food") on a graphical user interface 240 (referred to herein as "GUI") of a user device 200. The search system 300 generates final results 220 in response to the query 212. The final results 220 include primary results 222 (FIG. 2B) such as Diner 1, Diner 2, Diner 3, and Diner 4. The primary results 222 are displayed on the graphical user interface 240 as primary links 260. As depicted by FIG. 1A, the primary links 260 are associated with an application 204 displayed in a header 250. Each application 204 may be associated with one or more actions (described in detail herein). In some implementations, each application state is assigned the one or more actions associated with its corresponding application 204. For example, a Meal Review Application (FIG. 1A) provides the action of providing reviews for restaurants and meals. Therefore, when a user 10 selects a primary link 260aa corresponding to an application state of the Meal Review Application for Diner 1, the user 10 may view reviews relating to Diner 1. As another example, a Food Delivery Application (see Header 250b) provides the action of allowing a user 10 to order food to be delivered to a certain location. Therefore, when the user 10 selects the primary link 260ba corresponding to an application state of the Food Delivery Application for Diner 4, the user 10 may view a GUI 240 component that allows the user 10 to order food for delivery from Diner 4. In these examples, the actions assigned to each application state of the primary links 260 are the same actions associated with their respective parent applications 204 (e.g., the Meal Review Application and the Food Delivery Application). In other examples, the actions assigned to each application state may be based on the action performed by that particular application state rather than the application as a whole (see, e.g., FIG. 1C).

Returning to FIG. 1A, the final results 220 additionally include secondary results 224 displayed on the graphical user interface 240 as secondary links 270 associated with one or more primary links 260. The secondary results 224 are associated with an entity 431 (e.g., Diner 1, Diner 2, Diner 3, or Diner 4) of a primary link 260 (i.e., a primary search result 222) and execute an action different than the action associated with the application 204 displayed in the header 250. For example, referring back to the first primary link 260aa, the secondary links 270 included within the first primary link 260aa are each associated with the same entity as the first primary link 260aa: Diner 1. However, each of the secondary links 270 correspond to application states that perform a different action than the application associated with the first primary link 260*aa*. For example, the first secondary link 270 is a user-selectable link to an application state that allows the user 10 to contact a taxi to take the user 10 to Diner 1, which is not an action supported by the application of the header 250*a*. The second secondary link 270 is a user-selectable link to an application state that allows the user 10 to find coupons and discounts for Diner 1, which is also an action that is not supported by the Meal Review Application. The third secondary link 270 is a user-selectable link to an application state that navigates the user 10 to Diner 1, which is yet another example of an action that cannot be executed by application of the primary link 260*aa*.

FIG. 1C illustrates an example search system capable of inserting secondary results into a set of organic search results (i.e. the primary results 222) via the techniques described herein. Note that the GUI of FIG. 1C does not include primary links arranged under a header, as illustrated in FIG. 1A. Instead, the search system of FIG. 1C is configured to transmit final results that may not be grouped by application. In this example, the text, images, and any other content associated with a search result can be included within a boundary that acts as a user-selectable link (e.g., a search result "card"). In this way, each specific search result need not be grouped under a header indicating the application to which the search result belongs, thereby allowing the search results to be organized in many different ways. In one example, each card corresponding to a search result may be organized relative to other search results based on a result score indicating the relevance of the search result to the search query. In implementations such as the one depicted by FIG. 1C, the cards corresponding to search results may be organized in any suitable manner.

FIG. 1C depicts an example of the environment 100 illustrating the techniques described herein without the use of headers in the GUI. For ease of explanation, each search result depicted by FIG. 1C has an analogous search result represented by FIG. 1A (except fir the search result corresponding to the primary link 260*ca*). With respect to FIG. 1C, a user 10 enters a query 212 (e.g., "Late night food") on a GUI 240 of a user device 200. The user device 200 transmits the search query to the search system 300. The search system 300 generates final results 220 including primary results 222 as user-selectable links to different states of the following software applications: Meal Reviews App, Food Delivery App, and Pizza App (e.g., that provides pizza delivery). In this format (i.e., a SERI) not including headers 250), each search result is rendered as a card that acts as a user-selectable link to the application state indicated within the boundary of the card. In some implementations, actions are assigned to application states based on the functionality that a particular application state provides (as opposed to functionality provided by the application as a whole, as discussed with respect to FIG. 1A). For example, the primary link 260*aa* in the form of a first card indicates that selection of the primary link 260*aa* will cause the user device 200 to open the Meal Reviews App to a state that provides a review of Diner 1. Regardless of any other actions executable by the Meal Reviews App, the action associated with the application state of the primary link 260*aa* is the action of providing reviews. In another example, the primary link 260*ab* in the form of a second card indicates that selection of the primary link 260*ab* will cause the user device 200 to open the Food Delivery App to a state that allows the user to order food from Diner 4. Similarly to FIG. 1A, the final results 220 also include secondary results 224 that are displayed in the GUI 240 as secondary links 270 associated with one or more primary links 260. The secondary results 224 are associated with an entity 431 (e.g., Diner 1, Diner 2, Diner 3, Diner 4, or Diner 5) of a primary link 260 (i.e., a primary search result 222 represented in the GUI 240 in the form of a user-selectable card). The selection of a secondary link. 270 causes the user device 200 to execute an action different than the action indicated by the card (i.e., primary link 260) in which the secondary link 270 appears. Referring to the first card listed in the SERP depicted by FIG. 1C, selection of the primary link 260*aa* causes the user device to open the Meal Review application, which provides restaurant and meal reviews of Diner 1. In some examples, one or more secondary links 270 may also be displayed adjacent to, or within, the primary link 260. As shown, the secondary links 270 associated with the primary link 260*aa* include a link to an application state that allows the user to call/find a taxi to take the user 10 to Diner 1, a couponing link that provides the user 10 with coupons and discounts to Diner 1, and a navigation link that navigates the user 10 to Diner 1. These secondary links 270 provide actions different than the action provided by the primary link 260. For ease of explanation, the remainder of the examples below incorporate the use of headers 250, but it bears noting that headers 250 are not required to implement the techniques of the present disclosure and may be readily excluded as depicted by FIG. 1C.

FIG. 1D illustrates an example environment similar to the one depicted by FIG. 1C except for that FIG. 1D demonstrates the inclusion of advertisement results 522 in a combined result. Advertisement results 522 may be included into a combined result in addition or alternatively to a secondary result 224. Similarly to secondary results 224, advertisement results 522 are rendered in displayed within a combined result as user-selectable advertised secondary links 570. In this way, each secondary link 270 or set of secondary links 271 appearing in FIGS. 1A, 1C, 2A, and 3A-3C may be readily replaced with or include an advertised secondary link 570. Though the front-end process of including an advertised secondary link 570 in a combined result can be executed in the same manner as the process of including a secondary link 270 in a combined result, generating and selecting advertised secondary links 570 is discussed in detail below with respect to FIGS. 1E, 2B, 10, and 11A-11B.

As depicted by FIG. 1D, the search system 300 can configure advertised secondary links 570 to be rendered and displayed in a manner indicating that the links are advertisements. In one implementation, an advertised secondary link 570 may incorporate an image or logo associated with the application underlying the advertised secondary link 570, thereby indicating to a user that a developer or advertiser associated with the application has opted to advertise their application in a particular combined result. For example, as depicted by FIG. 1D, the first advertised secondary link 570 appearing in the SERP is a user-selectable link to the UBER® application (developed by Uber Technologies, Inc.). The advertised secondary link 570 to the UBER® application includes the UBER® logo, as opposed to the example depicted by FIG. 1C wherein the first secondary ink 270 provides a more general image of a car driving to a restaurant. Though both examples indicate the action performable by the application underlying the user-selectable link, the use of the UBER® logo may also indicate to a user that the link is an advertisement. In another implementation, an advertised secondary link 570 may additionally or alternatively include text, symbols, or another suitable indicator with the advertised secondary link to notify a user that the link is an advertisement. For example, the first advertised secondary link 570 in FIG. 1D contains text indicating that the link is an advertisement. In this example, combining the logo and the "Ad" text indicates to a user that the link is an advertisement. In another example, a search system 300 may not provide application-specific logos or indicators. In these examples, an advertised secondary link 570 may use more general images or figures, such as the image of scissors cutting out a coupon in the second advertised secondary link 570 of FIG. 1D, with any text or symbols indicating that the link is an advertisement. The search system 300 may configure advertised secondary links 570 to indicate that the advertised secondary links 570 are advertisements in any suitable manner. As mentioned previously, it bears noting that advertised secondary links 570 may be included alongside secondary links 270. For example, FIG. 1D depicts an advertised secondary link 570 to the UBER® application, an advertised secondary link 570 to a coupon application, and a secondary link 270 to a navigation application. In this way, a search system 300 may opt to include secondary links 270, advertised secondary results 570, or a combination thereof in combined results.

FIGS. 1A, 1C, and 11) illustrate an example environment 100 that includes a user device 200 associated with a user 10 and in communication with a remote system 110 via a network 120. FIG. 1B provides a functional block diagram of the environment 100. The remote system 110 may be a distributed system (e.g., cloud environment) having scalable/elastic computing resources 112 and/or storage resources 114. The user device 200 and/or the remote system 110 may execute a search system 300 and an entity system 400, and optionally receive data from one or more data sources 130. In some implementations, the search system 300 and the entity system 400 communicate with one or more user devices 200 and the data source(s) 130 via the network 120. The network 120 may include various types of networks, such as a local area network (LAN), wide area network (WAN), and/or the Internet.

In some implementations, the search system 300 includes a primary result generation module 310a, a secondary result generation module 310b, a result combination module 320, and a search data store 330. The search system 300 is in communication with an entity system 400. The entity system 400 includes an entity record generation module 410 in communication with an entity data store 420. The search data store 330 and the entity data store 420 may each include one or more databases, indices (e.g., inverted indices), tables, files, or other data structures which may be used to implement the techniques of the present disclosure.

Figure 2B:
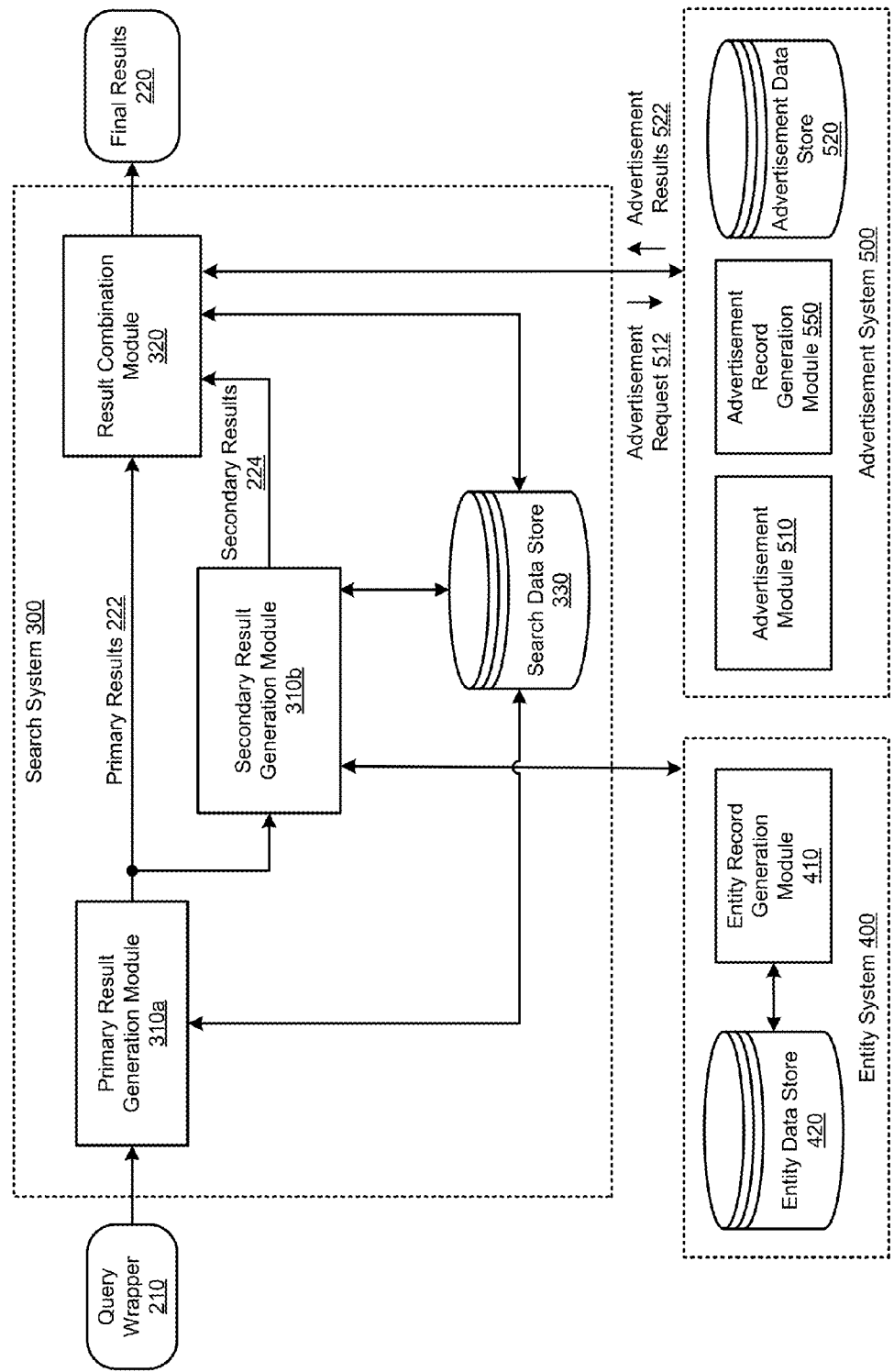
FIG. 2B is a functional block diagram of a search system interacting with an entity system and an advertisement system.

Referring to FIGS. 2A and 2B, the search system 300 receives a query wrapper 210 and generates final results 220 (e.g., search results) based on the data included in the search data store 330 and/or the entity data store 420. In some implementations, the search system 300 includes advertised link data 572 corresponding to advertisement results 522 from the advertisement system 500 in the final results 220. In some implementations, the primary result generation module 310a receives a query wrapper 210 from the user device 200 and retrieves application state records 340 included in the search data store 330 based on data included in the query wrapper 210, such as a search query 212. The secondary result generation module 310b retrieves entity records 430 included in the entity data store 420 based on data included in the query wrapper 210 and/or data included in the application state records corresponding to the primary results 222. The result combination module 320 receives primary and secondary results 222, 224, from the primary result generation module 310a and the secondary result generation module 310b, respectively. The result combination module 320 accesses the search data store 330 to retrieve data relating to the primary results 222. In some cases, the result combination module 320 may additionally receive advertisement results 522 from the advertisement system 500. The result combination module 320 generates combined results by associating the secondary results 224 and/or the advertisement results 522 with a primary result 222. Finally, the result combination module 320 sends the final results 220 (including both combined results and uncombined primary results 222) to the user device 200. The application state records 340 and the entity records 430 include one or more access mechanisms 202 that the user device 200 can use to access different functions for a variety of different applications 204, such as native applications 204a installed on the user device 200. The search system 300 transmits final results 220 including a list of access mechanisms 202 to the user device 200 that generated the query wrapper 210.

Referring to FIGS. 1A-2B, the modules 310a, 310b, 320 of the search system 300 are in communication with one another and with a data store 330. The search system 300 is configured to receive a query wrapper 210 (including a search query 212) from a user device 200. A user 10 may enter the search query 212 in a search field 214 of a GUI 240 of a search application 216 executing on the user device 200. The search system 300 is configured to output final results 220 based on the received query wrapper 210. The GUI 240 of the user device 200 displays the final results 220 including (primary link(s) 260 and, if available, one or more secondary links 270. The primary result generation module 310a receives a query wrapper 210 and generates primary results 222 based on the query wrapper 210. The secondary result generation module 310b receives the primary results 222 and generates secondary results 224 based on the data included in the entity data store 420. In some implementations, the secondary result generation module 310b receives application state records 340 corresponding to the primary results 222. In other implementations, the secondary result generation module 310b may receive the application identifiers 342 corresponding to the primary results 222. In these examples, the secondary result generation module 310b may utilize the application state identifiers 342 to retrieve the corresponding application state records from the search data store 330. The secondary result generation module 310b may utilize the data included in the application state records 340 of the primary results 222 to identify corresponding entities in the entity data store 420. In some examples, the primary result generation module 310a generates the primary results 222 based on the query wrapper 210 and the secondary result generation module 310b generates secondary results 224 based on one or more results of the primary results 222. The primary result generation module 310a communicates with the search data store 330 to determine the primary results 222, while the secondary result generation module 310b communicates with the search data store 330 and the entity data store 410 to determine the secondary results 224. The result combination module 320 associates the secondary results 224 to one or more primary results 222 to create the combined results of the final results 220 and outputs the final results 220. Therefore, referring back to FIG. 1A, the search system 300 allows the GUI 240 of the user device 200 to display one or more primary user-selectable links 260 grouped under a header 250 that includes a name of an application 204a, where each one of the primary links 260 is associated with the application 204a displayed in the header 250, and each one or more secondary user selectable links 270 is associated with one of the primary user-selectable links 260. As it relates to FIG. 1C, the search system 300 allows the GUI 240 of the user device 200 to display one or more primary user-selectable links 260 organized as cards in any reasonable manner (e.g., based on the relevance of the application state associated with the primary link 260 to the search query 212), whereby one or more secondary links 270 may be associated with one or more of the primary links 260.

FIGS. 1A-2A show an example user device 200 in communication with the search system 300. User devices 200 can be any computing devices that are capable of providing queries 212 to the search system 300. User devices 200 include, but are not limited to, mobile computing devices, such as laptops 200a, tablets 200b, smart phones 200c, and wearable computing devices 200d (e.g., headsets and/or watches). User devices 200 may also include other computing devices having other form factors, such as desktop computers 200e and computing devices in vehicles, gaming devices, televisions, or other appliances (e.g., networked home automation devices and home appliances).

The user devices 200 may use a variety of different operating systems 228. In examples where a user device 200 is a mobile device, the user device 200 may run an operating system 228 including, but not limited to, ANDROID® developed by Google Inc., IOS® developed by Apple Inc., or WINDOWS PHONE® developed by Microsoft Corporation. In an example where a user device 200 is a laptop or desktop computing device, the user device 200 may run an operating system 228 including, but not limited to, MICROSOFT WINDOWS® by Microsoft Corporation, MAC OS® by Apple, Inc., or Linux. User devices 200 may also access the search system 300 while running operating systems 228 other than those operating systems 228 described above, whether presently available or developed in the future.

A software application 204 may refer to computer software that, when executed by a computing device, causes the computing device to perform a task. In some examples, a software application 204 may be referred to as an "application," an "app," or a "program." Example software applications 204 include, but are not limited to, word processing applications, travel applications, reference applications, spreadsheet applications, messaging applications, media streaming applications, social networking applications, and games.

Applications 204 can be executed on a variety of different user devices 200. In some examples, a native application 204a may be installed on a user device 200 prior to a user 10 purchasing the user device 200. In other examples, the user 10 may download and install native applications 204a on the user device 200. Native applications 204a can perform a variety of different actions for a user 10. For example, a restaurant reservation application can make reservations for restaurants. As another example, an interact media player application can stream media (e.g., a song or movie) from the Internet. In some examples, a single native application 204a can perform more than one action. For example, a restaurant reservation application may also allow a user 10 to retrieve information about a restaurant and read user reviews for the restaurant in addition to making reservations. As another example, an interact media player application may also allow a user 10 to perform searches for digital media, purchase digital media, and generate media playlists.

The user 10 may access the action(s) of an application 204 on the user device 200 on which the application 204 is installed. Additionally or alternatively, the user 10 may access the action(s) of an application 204 via a remote computing device. In some examples, all of an application's action(s) are included on the user device 200 on which the application 204 is installed. These applications 204 may function without communication with other computing devices (e.g., via the Internet). In additional examples, an application 204 installed on a user device 200 may access information from other remote computing devices during operation. For example, a weather application installed on a user device 200 may access the latest weather information via the Internet and display the accessed weather information to the user 10 through the installed weather application. In further examples, an application 204 (e.g., a web-browser application 204b) may be partially executed by the user device 200 and partially executed by a remote computing device 300. For example, a web-browser application 204b may be an application 204 that is executed, at least in part, by a web server and accessed by a web browser of the user device 200. Example web applications 204b may include, but are not limited to, web-based email, online auctions, and online retail sites.

In general, the user device 200 may communicate with the search system 300 using any software application 204 that can transmit search queries 212 to the search system 300. In some examples, the user device 200 runs a native application 204a that is dedicated to interfacing with the search system 300, such as a native application 204a dedicated to searches (e.g., a search application 216). In some examples, the user device 200 communicates with the search system 300 using a more general application 204, such as a web-browser application 204b. Although the user device 200 may communicate with the search system 300 using the native search application 216 and/or a web-browser application 204b, the user device 200 may be described hereinafter as using the native search application 216 to communicate with the search system 300. In some implementations, the functionality attributed to the search application 216 may be included as a searching component of a larger application 204 that has additional functionality. For example, the functionality attributed to the search application 216 may be included as part of a native application 204a or a web application 204b as a feature that provides search capabilities.

The user device 200 generates user selectable links 250, 260, 270, 570 based on the received final results 220. Each user selectable link 250, 260, 270, 570 displayed to the user 10 may include an access mechanism 202. The user 10 may select a user selectable link 250, 260, 270, 570 on the user device 200 by interacting with the link 250, 260, 270, 570 (e.g., touching or clicking the link). In response to selection of a link 250, 260, 270, 570, the user device 200 may launch a corresponding software application 204 (e.g., a native application 204a or a web-browser application 204b) referenced by the access mechanism 202 and perform one or more operations indicated in the access mechanism 202.

Referring to FIGS. 1A-2B, in some implementations, the search system 300 includes primary and secondary result generation modules 310a, 310b, a result combination module 320, and a search data store 330. The primary result generation module 310a receives a query wrapper 210 and generates primary results 222 based on data included in the search data store 330. In some implementations, the primary result generation module 310a receives a query wrapper 210 from the user device 200 and retrieves application state records 340 included in the search data store 330 based on data included in the query wrapper 210, such as a search query 212. The application state records 340 (FIGS. 4A and 4B) include one or more access mechanisms 202 that the user device 200 can use to access different actions for a variety of different applications, such as native applications 204a installed on the user device 200.

The primary result generation module 310a is configured to receive a query wrapper 210 from the user device 200 via the network 120. A query wrapper 210 may include a search query 212, which may include text, numbers, and/or symbols (e.g., punctuation) entered into the user device 200 by the user 10. A user 10 may enter a search query 212 using a touchscreen keypad, a mechanical keypad, a speech-to-text program, or other form of user input. In general, a search query 212 may be a request for information retrieval (e.g., search results) from the search system 300. For example, a search query 212 may be directed to retrieving a list 251 of links 260, 270 to application actions or application states in examples where the search system 300 is configured to generate a list 251 of access mechanisms 202 as final results 220. In some examples, the user 10 enters a search query 212 into a search field 214 of the GUI 240 and the GUI 240 displays final results 220 (via the search application 216) as the user 10 is inputting the text. In other examples, the user 10 selects a search button 215 to trigger the search system 300 to execute the search.

The query wrapper 210 may include additional data along with the search query 212. For example, the query wrapper 210 may include geo-location data 206 that indicates the location of the user device 200, such as latitude and longitude coordinates. The user device 200 may include a global positioning system (GPS) receiver that generates the geo-location data 206 transmitted in the query wrapper 210. The query wrapper 210 may also include an IP address 209, which the primary result generation module 310a may use to determine the location of the user device 200. In some examples, the query wrapper 210 may also include additional data, including, but not limited to, platform data 208 (e.g., version of the operating system 228, device type, and web-browser version), an identity of a user 10 of the user device 200 (e.g., a username), partner specific data, and other data.

The search system 300 can use the search query 212 and the additional data included in the query wrapper 210 to generate the final results 220. For example, the search system 300 can determine a postal code or a geo-location of the user device 200, which the primary result generation module 310a can use along with the search query 212 to generate the primary results 222. In addition, the secondary result generation module 310b may use the geo-location of the user device 200 with the primary results 222 to generate the secondary results 224. Also, the result combination module 320 may use the geo-location with the primary and secondary results 222, 224 to generate the final results 220. In some implementations, the (primary result generation module 310a detects a location (e.g., a postal address, street name, city name, etc.) specified in the search query 212 (i.e., a query-specified location). In these implementations, the primary result generation module 310a can use the query-specified location along with the search query 212 to generate the final results 220.

The primary result generation module 310a retrieves application state records 340 included in the search data store 330 based on the received query wrapper 210 (e.g., based on the search query 212 and the geo-location data 206). In some implementations, the primary result generation module 310a generates result scores 226 for application state records 340 identified during the search. The result score 226 associated with an application state record 340 may indicate the relevance of the application state record 340 to the search query 212. A higher result score 226 may indicate that the application state record 340 is more relevant to the search query 212. The primary result generation module 310a may retrieve access mechanisms 202 from the scored application state records 340. The primary result generation module 310a outputs a result score 226 along with an access mechanism 202 retrieved from a scored application state record 340 in order to indicate the rank of the access mechanism 202 among other outputted access mechanisms 202.

The secondary result generation module 310b is in communication with the search data store 330 and the entity data store 420. The secondary result generation module 310b receives a primary result 222 and generates secondary results 224 based on the received primary result 222, more specifically, based on the entities 431 and actions of the primary results 222. In some implementations, the secondary result generation module 310b receives one or more primary results 222 from the primary result generation module 310a and finds entity records 430 included in the entity data store 420 based on the one or more primary results 222, where each primary result 222 may be associated with an entity 431 of an application state.

The entity system 400 includes an entity record generation module 410 and an entity data store 420 (e.g., non-transitory memory). The entity data store 420 stores entity records 430, each associated with an entity 431. An entity 431 may refer to a person, place, or thing. For example, an entity 431 may refer to a business, a product, a service, a piece of media content, a political organization/figure, a public figure, a destination, or another suitable item of commerce that may be advertised in connection with an application 204. An application state (e.g., accessed via an access mechanism 202) may perform actions related to an entity 431. With respect to the GUIs illustrated by FIGS. 1A and 1C, the application state of the Meal Review Application indicated by the primary user-selectable links 260ac is associated with the entity "Diner 3," In a more specific example, the entity "Diner 3" of FIGS. 1A and 1C could be a restaurant, such as CHIPOTLE MEXICAN GRILL©. In this example, the Meal Review Application could be an application that provides reviews of restaurants, such as YELP® (developed by Yelp, Inc.). As such, the primary selectable link 260ac shown in FIGS. 1A and 1C may correspond to a state of the YELP® review application that provides a review of the restaurant CHIPOTLE MEXICAN GRILL©.

The entity record generation module 410 generates entity records 430 (FIGS. 4A-4B) from the data sources 130 based on an entity 431 associated with a specific application state. Each entity record 430 may include data related to an entity 431. In some examples, an entity 431 is included in more than one application state. Referring back to the example of FIG. 1A, both the 'Meal Review App' and the 'Food Delivery App' may display different links 260, 260aa, 260ba, each relating to the same restaurant or entity 431 (e.g., MCDONALD'S© Restaurant), but having different application states or different application access mechanisms 202. Thus, an entity 431 may be included in different application states or application access mechanisms 202. In this example, the "MCDONALD'S® Restaurant" entity 431 can be associated with a first application state from a first application (i.e., 'Meal Review Application') and a second application state from the second application i.e., 'Food Delivery Application').

In some implementations, an action ontology may be stored by the search system 300 and entity system 400 in the form of a list of actions corresponding to application states. The search system 300 and the entity system 400 can use the action ontology to assign actions to their respective records (e.g., application state records 340 and entity records 430). For example, the search system 300 may include one or more modules (not shown) that can assign actions to application state records 340. As another example, the entity system 400 may utilize the entity record generation module 410 and/or one or more modules (not shown) to assign actions to entity records. The action ontology may be defined by a system operator. In some examples, the system operator can create an action ontology specific to the search system 300 and entity system 400. In other examples, the system operator may select actions from an existing ontology such as one provided by schema.org (maintained by Google, Inc., Yahoo, Inc., Microsoft Corporation, and Yandex). In this way, actions may be assigned to application states manually and/or automatically.

In some examples, application states may be marked up (e.g., tagged) with actions by third parties (e.g., application and/or website owners/developers other than those that operate the search system 300 and the entity system 400). In these examples, the search system 300 and the entity system 400 can utilize the marked up actions to assign actions to application states. In other examples, the system operator may assign actions to application states and web pages at the application and domain level, respectively. For example, a food review application may be assigned the action "read review." The search system 300 and entity system 400 may then assign the application-level action "read reviews" across every state of the food review application automatically. In a different example, the system operator may assign actions to application states and web pages individually (e.g. a sample size of different states/pages). The search system 300 and entity system 400 can then assign actions to similar states in the application/website. For example, the system operator can manually assign the action "read review" to astute/page and replicate this assignment across other states/pages at the same level in the application/website (e.g., all states/pages related to reading reviews). More specifically, if the action related to the manually-assigned state/page relates to reading reviews about restaurants, any other states also related to reading reviews about restaurants will automatically be assigned the same action as the manually-assigned state/page. As another specific example, if a state/page of a movie database application/website relates to specific movie information, that state/page can be assigned the action "read movie information" manually by the system operator. The search system 300 and entity system 400 may then apply the action "read movie information" across the rest of the states/pages of the movie database application/website that allow a user to view information related to a specific movie.

Example actions may include, but are not limited to: Navigate to a location, Find transportation to a location, Provide restaurant information, Order food from a restaurant, Provide food photos. Show menu, Find a business, Provide reviews of business, Provide food recipes, Send message, Check stocks, Check weather, Check sports scores, Play music, Play movie, Listen to radio station(s), Record video, Provide discount.

In some examples, one or more primary user-selectable links 260 may be associated with a header 250 that includes an application name (e.g., "Meal Review Application") and may each perform the same action. In the example provided by FIG. 1A, the primary user-selectable links 260 associated with the header 250 for the Meal Review Application provide the action "read reviews" for Diner 1, Diner 2, and Diner 3, respectively. Thus, the different states for each of the restaurants of the application included in the header 250 may be assigned the same action: "read review" In implementations that do not utilize a header 250 (e.g., FIG. 1C), each individual primary user-selectable link 260 corresponding to a final result 220 may be rendered and displayed as a card in a SERP. In these examples, each card may represent an application state and thereby be associated with an entity and one or more actions. In some implementations, the cards may represent organic search results ranked based on the relevance of their underlying application state to the search query 212. Accordingly, more than one card may correspond to the same application if a single application is associated with the most relevant application states.

Referring back to FIG. 2B, the secondary result generation module 310b receives a primary result 222 (e.g., an application state ID, an application access mechanism 202, and/or an application state record 340 corresponding to the application state of the primary result 222) from the primary result generation module 310a and identifies one or more actions associated with the primary result 222 (e.g., using the application state records 340). The primary result 222 is also associated with an entity 431 (e.g., business, product, service, media content, political organization/figure, public figure, and destination). The secondary result generation module 310b generates secondary results 224 by identifying application states corresponding to the same entity as the primary result and different actions than the primary action(s) (i.e., the action(s) associated with the primary result received by the secondary result generation module 310b). The secondary result generation module 310b outputs the secondary results 224 to the result combination module 320.

In a more specific example, the secondary result generation module 310b may receive a primary result 222 (e.g., an application access mechanism 202 or application state ID 342) corresponding to an application state of the Meal Review Application associated with "Diner 1," such as is depicted by FIGS. 1A and 1C with respect to the primary link 260aa. For ease of explanation, "Diner 1" may represent a restaurant such as THE FRENCH LAUNDRY®. In this example, the secondary result generation module 310b accesses the search data store 330 to retrieve the application state record 340 corresponding to the primary result 222. The secondary result generation module 310b uses the application state record 340 to determine that the primary result 222 is associated with the action "review business." The secondary result generation module 310b can further determine, based on the application state record 340, that the primary result 222 is associated with the entity THE FRENCH LAUNDRY®. Using this information, the secondary result generation module 310b retrieves the entity record 430 for the entity THE FRENCH LAUNDRY® from the entity data store 420. The secondary result generation module 310b extracts access mechanisms 202 from the entity actions 440 of the entity record 430 that execute actions other than "read review," such as "make restaurant reservations" or "get a cab." These access mechanisms 202 can cause a user device 200 to execute an application state that performs an action not supported by the Meal Review Application; these access mechanisms 202 execute application states that allow a user to make a reservation at THE FRENCH LAUNDRY® or get a cab to "THE FRENCH LAUNDRY®, respectively. In this way, the secondary result generation module 310b retrieves access mechanisms 202 for application states associated with the same entity but different actions than the primary result 222. The secondary result generation module 310b transmits the extracted access mechanisms 202 (i.e., secondary results 224) to the result combination module 320.

Referring back to FIG. 1A, the primary result generation module 310a receives a search query 212 from the user device 200 and retrieves application state records 340 from the search data store 330. An application state record 340 may be associated with the Meal Review Application 204 displayed in a first header 250a, and another application state record 340 may be associated with the Food Delivery Application 204 displayed on a second header 250b. As shown, only two applications 204 associated with application state records 340 are displayed; however, more or fewer applications 204 associated with application state records 340 may be displayed. The secondary result generation module 310b determines an entity 431 and an action associated with each of the application state records 340, and determines the secondary results 224 based on the entity 431 and the action(s) associated with each of the application state records 340, respectively. In this case, for the Meal Review Application, the action is "read review" and the entity 431 is any one of "Diner 1," "Diner 2," or "Diner 3." Thus, the secondary results 224 may not include any "read review" actions, since the secondary results 224 include a different action than the primary results 222. Although FIG. 1A depicts an example where each application state record 340 of the Meal Review Application is assigned the same action (e.g., "read review"), in other examples each application state record 340 of a particular application may be assigned a different action.

Returning to FIG. 2B, the result combination module 320 receives primary results 222 from the primary result generation module 310a, secondary results 224 from the secondary result generation module 310b, and advertisement results 522 from the advertisement module 510. The result combination module 320 associates the secondary results 224 and/or advertisement results 522 with their corresponding primary results 222 to generate the combined results of the final results 220. The result combination module 320 transmits final results 220 including a list of access mechanisms 202 to the user device 200 that generated the query wrapper 210. The result combination module 320 communicates with the search data store 330 to retrieve application access mechanisms 202 from the primary application state records 340 of the primary results 222 and from the secondary application state records 340 of the secondary results 224. The result combination module 320 may additionally communicate with the search data store 330 to retrieve application access mechanisms 202 from the application state records 340 corresponding to the advertisement results 522. In some implementations, the advertisement module 522 may include the application access mechanisms 202 corresponding to the applications of the advertisement results 522 in the advertised link data 572. The result combination module 320 includes primary and secondary link data 262, 272 as well as advertised link data 572 (e.g., retrieved from the data store 330 or the advertisement system 500) in the final results 220 before transmitting the final results 220 to the requesting user device 200.

The result combination module 320 may be configured to select which of the primary links 260 wilt include secondary links 270. The result combination module 320 may make this determination in a variety of ways. In one example, the result combination module 320 may include secondary links 270 in each of the primary links. In another example, the result combination module 320 may use the result scores generated by the primary result generation module 310a to determine which of the corresponding primary links 260 will include secondary links 270. In these examples, the result combination module 320 may select the primary links 260 corresponding to primary results 222 with the N-highest result scores, where N represents an integer greater than zero. In some examples, the result combination module 320 may generate its own scores for the primary links 260 based on any number of criteria, such as the popularity of the primary links' underlying application state, and select the primary links 260 based on the scores (e.g., select the N highest scores).

The result combination module 320 determines which secondary results 224 to include in the selected primary results 222. In some examples, the result combination module 320 may be configured to associate a threshold or maximum number of secondary results 224 with a selected primary result 222. For example, in scenarios where the result combination module 320 receives more secondary results 224 than can be rendered and displayed as secondary links 270 with a single primary link 260, the result combination module 320 may associate a pre-defined or dynamically-generated number of secondary results 224 (e.g., three secondary results) with the selected primary result 224. In another example, the result combination module 320 may utilize the application state records 340 corresponding to the secondary results 224 to generate result scores indicating the relevance of the secondary results 224 to the search query 212. In yet another example, the result combination module 320 may utilize the application state records 340 to generate a result score that represents the relative popularity of the secondary results 224. In the examples utilizing a result score, the result combination module 320 may select the secondary results 224 corresponding to the N-highest result scores. The result combination module 320 may utilize any suitable scoring algorithm to determine the result scores associated with each secondary result 224. As a non-limiting example, the result combination module 320 may utilize a scoring algorithm such as the one described with respect to FIG. 8 below. In a different example, the result combination module 320 may select secondary results 224 based on specific properties of the actions and/or entities of a selected primary result 222. In other words, a particular type of primary result 222 may trigger the selection of a specific type secondary result 224. For example, if a selected primary result 222 is associated with an entity that corresponds to a geo-location, the result combination module 320 may include at least one secondary result 224, if available, that provides the "navigate" action. In another similar example, if a selected primary result 222 is associated with the action "view menu," the result combination module 320 may include at least one secondary result 224, if available, that provides the "mike reservation" action. In a different example, the result combination module 320 may select secondary results 224 based on the likelihood that a combined result will be clicked on or interacted with by a user. For example, the search system 300 may receive usage data provided by a user device 200 upon a user's 10 consent. In this example, the result combination module 320 may utilize the usage data to determine a percentage indicating the likelihood that a user will click on a particular secondary result 224 that is part of a combined result. The result combination module 320 may then select secondary results 224 based on the percentage (e.g., the secondary results 224 associated with the N-highest percentages). In yet another example, the result combination module 320 may select secondary results 224 randomly.

The result combination module 320 can include advertised secondary links 570 in a combined result based on the contents of the advertisement results 522. The result combination module 320 transmits an advertisement request 512 to the advertisement system 500. The advertisement system 500 generates advertisement results 522 based on the advertisement request 512 and data included in the advertisement record data store 520 (e.g., advertisement records 530 of FIG. 10B). The advertisement system 500 transmits the advertisement results 522 to the result combination module 320.

The result combination module 320 may generate the advertisement request in a variety of different ways. In some implementations, the result combination module 320 generates an advertisement request 512 based on a primary result 222 (e.g., a primary result that is selected to become a combined result). In these implementations, the result combination module 320 can include the action and entity of the primary result 222 (e.g., a primary entity-action pair) in the advertisement request 512. The result combination module 320 may include one or more advertisement results 522 in a combined result regardless of whether the combined result includes any additional secondary results 224. For example, the result combination module 320 may make an advertisement request 512 for an advertisement result 522 even if the combined result does not include additional secondary results 224.

In some implementations, the result combination module 320 may generate an advertisement request 512 based on both the primary result 222 and the secondary results 224 that may be included in the combined result. For example, the result combination module 320 may identify a set of secondary results 224 and then generate an advertisement request 512 including the actions and entity associated with one or more of the identified secondary results 224 (e.g., secondary entity-action pairs). In some implementations, the result combination module 320 can include any other data that the advertisement system 500 can utilize to generate advertisement results 522. For example, the result combination module 320 can include a maximum number of advertisements requested. Additionally or alternatively, the result combination module 320 can include data from the application state records 340 of the primary and secondary results 222, 224 such as application access mechanisms 202, application state IDs 342, application state information 344, or any other suitable data.

FIG. 2B illustrates an example advertisement system 500 that includes an advertisement module 510, an advertisement record generation module 550, and an advertisement data store 520. The advertisement system 500 receives an advertisement request 512 from the search system 300 and returns advertisement results 522. The advertisement record generation module 550 generates advertisement records 530 based on advertisement campaigns which are created and updated by advertisers (e.g., a developer of an application, an owner of an application, and/or a third party hired to advertise an application/entity). The advertisement module 510 generates advertisement results 522 based on the advertisement request 512. For example, the advertisement module 510 may retrieve advertisement records 530 from the advertisement data store 520 based on the advertisement request 512 and then generate advertisement results 522 based on advertisement request 512 and the retrieved advertisement records 530.

Figure 1E:
FIG. 1F is a schematic view of an example campaign manager interface displayed on an advertiser device.

The advertisement record generation module 550 communicates with advertiser devices 50 (e.g., FIG. 19) via an advertisement campaign manager (FIG. 1E). The advertisement system 500 (e.g., the advertisement record generation module 550) may provide the advertisement campaign manager to the advertiser devices 50. The advertiser devices 50 can use the advertisement campaign manager to generate advertisement records 530 that are stored in the advertisement data store 520.

FIG. 1E illustrates an example campaign manager appearing on an advertiser device 50. The input fields and appearance of the campaign manager illustrated by FIG. 1E is for example purposes only. It is contemplated that a campaign manager may include additional or alternative fields than those illustrated in FIG. 1E. Accordingly, it is contemplated that other suitable input fields and/or other GUI elements may be included in the campaign manager of FIG. 1E.

The advertisement record generation module 550 generates an advertisement campaign manager that can be rendered and displayed as a GUI (FIG. 1E) on an advertiser device 50. An advertiser can use an advertiser device 50 (e.g., a computing device connected to the Internet) to provide settings, preferences, and any other suitable details pertaining to the manner in which advertisements associated with the advertiser's application should be displayed. In some implementations, the advertisement record generation module 550 may provide data to an advertiser device 50 (e.g., via the Internet) that the advertiser device 50 may utilize to render a GUI for the advertisement campaign manager. In some implementations, the advertisement system 500 may provide an application for installation on an advertiser device 50. In these implementations, the application may be configured to render a GUI for the advertisement campaign manager and to communicate with the advertisement system 500. The advertisement record generation module 550 may generate advertisement records 530 based on the settings, preferences, and other details input into the advertisement campaign manager by the advertiser. Advertisement records may refer to any suitable data structures that the advertisement record generation module 550 may generate based on the data received from the advertisers via the campaign manager. In response to a received advertisement request 512, the advertisement module 512 can retrieve advertisement records 530 and utilize the advertisement records 530 to generate advertisement results 522.

Figure 10A:
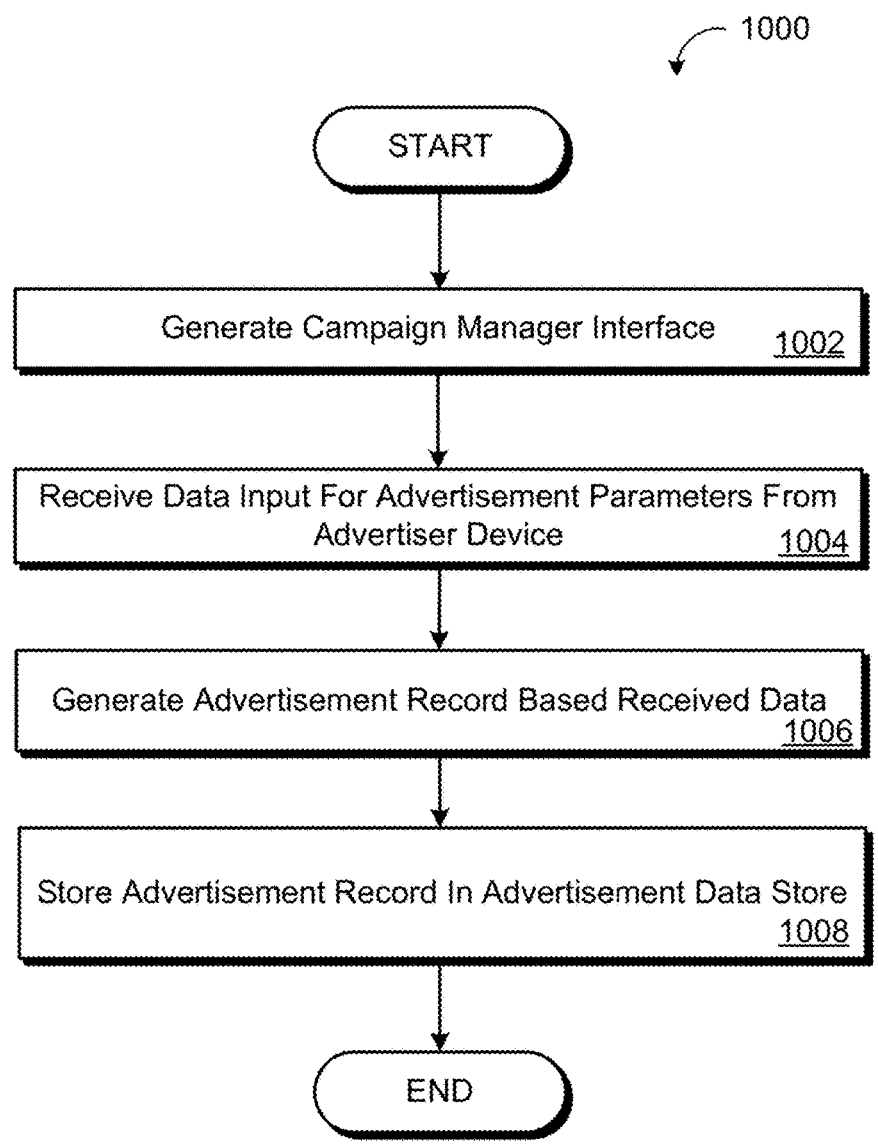
FIG. 10A is a schematic view illustrating an example method for generating advertisement records.
Figure 10C:
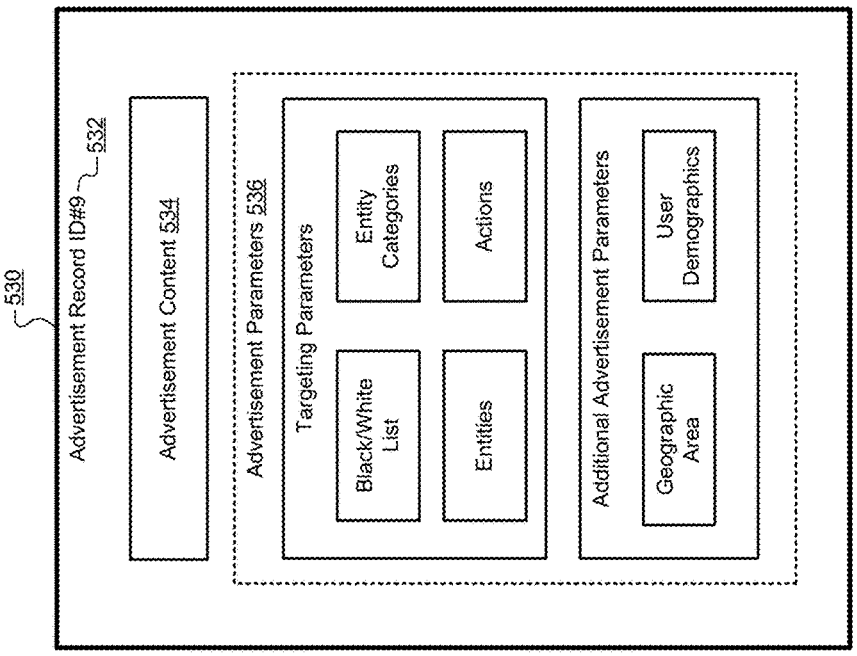
FIGS. 10B and 10C are schematic views of an example advertisement record.
Figure 10B:
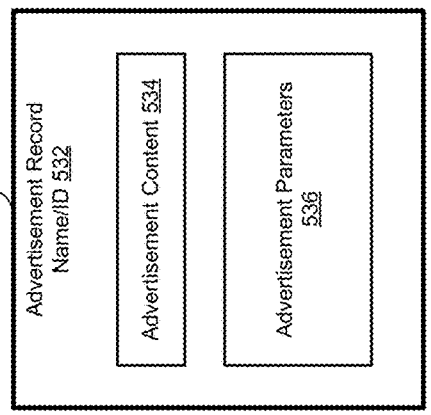

FIGS. 10B and 10C illustrate an example advertisement record 530. An advertisement record 530 may include a variety of different types of data related to an advertisement. An advertisement record 530 may include data that uniquely identifies the advertisement record 530. For example, the advertisement record 530 may include an advertisement name and/or advertisement identifier 532 (i.e., "advertisement ID") that identifies the advertisement record 530 among the different advertisement records 530 in the advertisement data store 530.

An advertisement record 530 may also include advertisement content 534. Advertisement content 534 may include data used by the advertisement system 500 to generate advertisement results 522. For example, advertisement content 534 may include text associated with the underlying application/link of a potential advertisement, such as a name of the developer of the underlying application. The advertisement content 534 may also include images (e.g., images to be displayed in the secondary links), such as an application icon (e.g., an icon for the UBER® application of FIG. 1D). An application icon may be an image that represents the application. An image may also include screenshots or previews of the underlying application/state. The advertisement content 534 may also include links to locations from which the underlying application may be downloaded. For example, the advertisement content 534 may include hyperlinks to one or more digital distribution platforms from which the underlying application may be downloaded.

An advertisement record 530 may include advertisement parameters 536. Advertisement parameters 536 may define budgets associated with advertising, timing parameters associated with advertising (e.g., start and stop dates), and a variety of different types of targeting parameters. A targeting parameter may refer to a condition that should be satisfied before the advertisement system generates an advertisement. Example types of targeting parameters may include, but are not limited to, a "black list" targeting parameter (e.g., a list of applications with which an advertisement should not appear), a "white list" targeting parameter (e.g., a list of the only applications with which an advertisement should appear), entity targeting parameters (e.g., a list of entity names or entity categories of a primary result), action parameters (e.g., a list of actions of a primary result).

An advertiser may use an advertiser device 50 to input data using a campaign manager that corresponds to the fields of an advertisement record 530. In this way, an advertiser can provide data about their advertised application that the advertisement system 500 may use to populate the advertisement content 534 and advertisement parameters 536 of an advertisement record 530.

In some implementations, an advertiser may utilize an advertisement campaign manager to specify advertisement parameters 536 such as entity names, entity categories, or actions of a primary result 222 that trigger the inclusion of the advertiser's advertised secondary link 570 in a combined result (i.e., targeting parameters). For example, an advertiser may create an advertisement campaign corresponding to a restaurant review application. In this example, the advertiser may identify CHIPOTLE® as an entity that triggers the inclusion of the advertiser's advertised secondary link 570. Additionally or alternatively, the advertiser may identify "restaurant" as the entity category that triggers the inclusion of their advertised secondary link 570. In this way, an advertiser can broaden the scope of entities that trigger the inclusion of the advertiser's advertised secondary link 570 in a combined result. Continuing this example with respect to actions, the advertiser may identify the action "order food for delivery" as an advertisement parameter 536 that triggers the inclusion of the advertiser's advertised secondary link 570.

In some implementations, an advertiser can use an advertisement campaign manager to provide targeting parameters in the form of a list of applications with which the advertiser's advertised secondary links 570 should not appear (e.g., a "black list"). For example, an advertiser may indicate that the advertiser's advertised secondary link 570 may not appear in a combined result if the primary result 222 is associated with a competing software application. Additionally, or alternatively, an advertiser can indicate a list of applications that the advertiser's advertised secondary links 570 should appear in (e.g., a "white list"). For example, an advertiser may indicate that their advertised secondary links 570 may only appear in a combined result if the primary result 222 is associated a partner application of the advertiser (e.g., a different application developed, maintained, or advertised for by the same advertiser).

In some implementations, an advertiser may utilize a campaign manager to specify individual application states of the advertiser's application to advertise. In other implementations, an advertiser may allow the advertisement system 500 and/or the search system 300 to determine the best application state to advertise (e.g., based on a relevance score, discussed herein). For an example, an advertiser of the OPENTABLE® application may indicate to the advertisement system 500 that it may only generate advertisements for application states of the OPENTABLE® application that allow a user to make reservations at a restaurant. In another example, an advertiser of the IMDB® application may indicate to the advertisement system that it may generate advertisements for any of the application states of the IMDB® application.

In some implementations, an advertiser may utilize a campaign manager provided by the advertisement record generation module 550 to specify other advertisement parameters 536 such as a bid price and a payment model. In one example, an advertiser can opt for a cost-per-impression (CPM) payment model, whereby the advertiser pays the specified bid price whenever the advertiser's advertised secondary link 570 is displayed. In another example, an advertiser can opt for a cost-per-click (CPC) payment model, whereby the advertiser pays the specified bid price whenever the advertiser's advertised secondary link 570 is clicked on. In another example, an advertiser can opt for a cost-per-action (CPA) payment model, whereby the advertiser pays the specified bid price whenever a user engages with the advertiser's advertised secondary link 570 in a specific way (e.g., a user completes a transaction or installs an application the user was led to by the advertised secondary link 570).

In some implementations, an advertiser may utilize a campaign manager to provide a plurality of additional targeting parameters. For example, the advertiser may specify a geographic area in which the advertisement should appear, a time of day that the advertisement should appear, and/or physical conditions in which the advertisement should appear (e.g., when device movement indicates that the user is in a vehicle). Additional examples of targeting parameters include, but are not limited to, user demographics of the users to whom the advertisement should appear, a device platform of the devices on which the advertisement should appear, an installation status of an application for which the advertisement should appear, and any other suitable parameters related to the underlying application of the advertiser's advertised secondary link 570.

An advertiser may also use a campaign manager to provide data corresponding to the advertisement content 534 of an advertisement record 530. For example, the advertiser may provide an application name, an image of an application logo or other images related to an application, access mechanisms or uniform resource locators to an application, text describing the application, or any other suitable information related to the advertised application. In some implementations, the campaign manager provided by the advertisement record generation module 550 may provide preview functionality that illustrates an example of how the advertised secondary links 570 will be displayed based on the available advertisement content 534.

In some implementations, an application developer or third party associated with a software application of a (primary result 222 may interact with the advertisement system 500 via a campaign manager to specify advertised secondary links 570 that are allowed or not allowed to be included alongside primary links 260 corresponding to their application. For example, an application developer may not want to include advertised secondary links 570 to certain competing applications. A primary link developer and/or third party advertiser for a primary link may specify (e.g., via a campaign manager) several other settings and preferences with regard to advertisements displayed with their primary link(s). For example, a primary link advertiser and/or developer may specify a list of actions, a maximum number of allowed advertisements, the position of advertisements e.g. a location with respect to the primary link an advertisement is allowed to appear), a minimum expected revenue of the advertisements, a minimum relevance or popularity of the advertisements, and other settings or preferences. The advertisement system may take into account both the primary and secondary application developers' (i.e., advertisers, developers, or other parties associated with a primary or secondary link) preferences in cases where a primary application developer specifies preferences and/or settings.

In some implementations, a revenue sharing system (not shown) can be included in the environment 100 and communicate with the search system 300, the entity system 400, and the advertisement system 500. The revenue sharing system may be configured to manage the sharing of revenue resulting from displaying advertised secondary links 570. The revenue sharing system may incentivize developers to develop and intertwine related actions. For example, IMDB® is an application that provides movie information and MovieFone™ is an application that allows users to buy movie tickets. A user 10 searching for a movie may be presented with a primary link 260 to a state of the IMDB® application. In the combined result for the IMDB® application, there may appear an advertised secondary link 570 to the MovieFone™ application. In this example, if the user buys tickets using the MovieFone™ application, the revenue system may split the revenue generated based on an agreement between the advertisers of the IMDB® and MovieFone™ applications.

The result combination module 320 may be configured to select how and where (e.g., a location within a combined result) a primary result 222 will include one or more advertisement results 522. In some implementations, the result combination module 320 can generate an advertisement request 512 including the entity and action of a primary result 222 and a number of requested advertisement results 522. In these examples, the result combination module 320 can reserve space in a combined result for the specified number of advertisement results 522. For example, with respect to FIG. 1D, the displayed combined result contains two advertised secondary links 570 and a non-advertised secondary link 270. In this example, the result combination module 320 reserves two spaces in the combined result for the requested advertised results 522. In this manner, the result combination module 320 provides advertisers opportunities to display their applications in situations where they may not otherwise appear. For example, search system 300 may select other, non-advertised secondary links 270 based on other factors such as relevance or popularity. More specifically, in this example, there may be N secondary links 270, several of which may be more popular or relevant than a particular advertisement result 522. In this case, the opportunity for advertisement may cause the advertisement result 522 to be placed in a combined result where amore relevant or popular link would otherwise appear. This technique additionally allows advertisers to display their advertisements in prime locations of a combined result. For example, in FIG. 1D the advertised links 570 are displayed in the first two spaces of the combined result.

In other implementations, the result combination module 320 can generate an advertisement request 512 including the entity and action of a primary result 222 and data related to a set of secondary results 522 (e.g., application state IDs, entities, actions, and any other information related to a set of secondary results 224). In these examples, the result combination module 320 may utilize received advertisement results 522 to determine whether any of the secondary results 224 in the set present advertisement opportunities. In other words, the advertisement results 522 may indicate to the result combination module 320 that one or more of the secondary results 224 in the set are associated with an advertisement campaign (e.g., the underlying application appears in an advertisement record 530). In these examples, the result combination module 320 may generate a combined result including the subset of secondary results 224 associated with an advertisement campaign. In this way, the result combination module 320 may prioritize the secondary results 224 capable of generating revenue. For example, returning to FIG. 1D, the result combination module 320 includes data with respect to several secondary results 224 in the advertisement request 512. The advertisement results 522 indicate to the result combination module 312 that the secondary results 224 in the set associated with the UBER® application and a couponing application should be included in the combined result because they present advertising opportunities. Based on this indication, the result combination module 320 includes both of the advertised secondary results 224 over other secondary results 224 (e.g., those that are not associated with an advertisement campaign) in the combined result.

The advertisement module 510 receives an advertisement request 512 from the result combination module 320, identifies advertisement records 530 based on the advertisement request 512, and transmits advertisement results 522 based on the identified advertisement records 530. In some implementations, the advertisement request 512 received by the advertisement module 510 may indicate an entity and action associated with a primary result 522. In these implementations, the advertisement module 510 identifies advertisement records 530 associated with the same entity and different action than the entity and action of the advertisement request 512. The advertisement module 510 can utilize any suitable technique to identify advertisement records 530 in the advertisement data store 520 that satisfy the advertisement request 512. For example, the advertisement module 510 can identify potential advertised secondary links 570 based on text matches between terms of the advertised secondary links' 570 corresponding advertisement records 530 and the terms of the advertisement request 512. In some examples, the advertisement module 510 may identify more advertisement records 530 capable of satisfying the advertisement request 512 than are requested by the advertisement request 512. For example, the advertisement request 512 may request one advertisement, but the advertisement generation module 510 may identify ten potential advertisements. In this example, the advertisement module 510 can select which advertisement records 530 the advertisement results 522 will be based on using techniques described herein.

As described herein, in some cases, the advertisement module 510 may identify multiple potential advertisements in response to the advertisement request 512. If the number of potential advertisements is greater than will be inserted into the search results, the advertisement module 510 may select a subset of the potential advertisements (e.g., advertisement records) to use to generate advertisement results 522.

The advertisement module 510 can select between multiple potential advertisement records using a variety of techniques. In one example, the advertisement module 510 can select advertisement records 530 based on the likelihood that a user will click on an advertisement record's 530 corresponding advertised secondary link 570. In these examples, the advertisement module 510 can determine a percentage likelihood that a user will click on an advertised link 570 based on user usage data (e.g., user analytics). The advertisement module 510 can select the application records 530 corresponding to the N-highest percentages, where N may be a number of advertisements selected for display in the search results (e.g., indicated by the application request 512).

In another example, the advertisement module 510 can select advertisement records 530 based on an amount to be paid in exchange for displaying a potential advertisement. In these examples, the advertisement module 510 can select the advertisement record 530 specifying the highest bid price. In another example, the advertisement module 510 can select advertisement records 530 based on a calculation of the expected revenue from displaying an advertised secondary link 570. In these examples, the advertisement module 510 can calculate expected revenue based on the bid price, payment model, and other information indicated by the corresponding advertisement record 530. In these examples, the advertisement module 510 can select the advertisement records 530 with the N-largest expected revenues. For example, if a particular advertisement record 530 indicates a cost-per-click (CPC) payment model, the advertisement module 510 can calculate expected revenue by multiplying the percentage likelihood a user will click on the corresponding advertised secondary links 570 with the bid price indicated by the advertisement records 530 and select the advertisement record 530 with the largest expected revenue. In a more specific example, the advertisement module 510 may select a first advertisement record 530 indicating a bid price of one cent ($0.01) over a second advertisement record 530 indicating a bid price of two cents ($0.02) if the first advertisement record 530 is five times more likely to be clicked on by a user. Similarly, in this example, the advertisement module 510 may select the first advertisement record 530 if it is much more relevant than the second advertisement record 530 as indicated by its corresponding relevance score (discussed below). Any of the techniques for selecting between advertisement records 530 discussed herein may be combined or used together as part of the advertisement record 530 selection process.

In some examples, the advertisement module 510 may generate relevance scores for the advertisement records 530 of the potential advertised secondary links 570 that indicate the relevance of the underlying applications to the search query 212. For example, the advertisement module 510 perform text matching between terms of the advertisement records 530 and terms of the search query 212. In this example, the advertisement module 510 may assign higher relevance scores to advertisement records 530 with a higher concentration of text matches. Similarly, the advertisement module 510 may assign lower relevance scores to advertisement records 510 with a low concentration of text matches. In other examples, the advertisement module 510 may retrieve or generate popularity scores indicating the popularity of the potential advertised secondary links' 570 underlying application states. In examples where the advertisement module 510 generates or determines a score (e.g., a relevance score or a popularity score), the advertisement module 510 may select the advertisement records 530 corresponding to N-highest scores, where N is a number of advertisements indicated by the application request 512.

The advertisement module 510 generates advertisement results 522 based on the selected advertisement records 530 (e.g., selected advertisement records 530 from a group of potential advertisement records 530). In some cases, such as in the case where the result combination module 320 reserves space for an advertisement, the advertisement module 510 may provide link data 572 such as text, images, or any other information in the advertisement results 522. For example, the advertisement module 510 can extract information (e.g., advertised secondary link data 572) from the advertisement records 530 that the result combination module 320 can utilize to generate advertised secondary links 570. In a specific example related to FIG. 1D, the advertisement module 510 provides link data 572 related to the UBER® application that allows the user device 200 to render and display the UBER® icon in a SERP. In other examples, such as in the case where the result combination module 320 transmits data related to several secondary results 222, the advertisement module 510 may only include data indicating which of the several secondary results 224 present advertisement opportunities. In these examples, the advertisement results 522 may include an application state identifier 342, an application name, or other information that the result combination module 320 can utilize to locate a corresponding application state record 340 in the search data store 330 or to identify a secondary result 224 from other secondary results 224. In another specific example related to FIG. 1D, the second advertised secondary link 570 representing a couponing application corresponds to a secondary result 224. The advertisement module 510 may include the application state ID 342 of the couponing application in the advertisement results 522 to indicate that its corresponding secondary result 224 presents an advertisement opportunity. In this example, the result combination module 320 uses the application state ID 342 in the advertisement results 522 to retrieve link secondary link data 272 and may then append data (e.g., text) to the secondary link data 272 to indicate that the link corresponds to an advertisement. As shown by FIG. 1D, the user device 200 may then utilize the modified secondary link data 272 to display the secondary link 270 as an advertised secondary link 570. In some implementations, advertised secondary links 570 may be dynamically generated. In these examples, advertised secondary link data 572 may be updated based on data included in the advertisement request 512 or the search query 212 (e.g., geo-location data). In other implementations, advertised secondary link data 572 may be static or use default values (e.g., when corresponding data values are not provided by the search system 300).

Returning to FIG. 2B, the primary and secondary result generation modules 310a, 310b may also include additional data in their respective results 222, 224. The result combination module 320 may transmit the additional data to the user device 200 to be used to help render and display user-selectable links 250. For example, the primary result generation module 310a may transmit data (e.g., text and/or images) to be included in the user-selectable links 250. Data for the user selectable links 250 (e.g., text and/or images) may be referred to herein as "link data" (e.g., link data 252, 262, 272, 572). The result combination module 320 may organize the link data such that it corresponds to the combined results of the final results 220, allowing secondary results 224 and/or advertised secondary results 524 to be displayed within or adjacent to the (primary results 222. The user device 200 displays the user-selectable links 250 to the user 10 based on received link data 252, 262, 272, 572. Each user-selectable link 250, 260, 270, 570 may be associated with an access mechanism 202 included in the final results 220, such that when a user 10 selects a link 250, 260, 270, 570, the user device 200 launches the application 204 referenced in the access mechanism 202 and sets the application 204 into the state specified by the access mechanism 202. Although the search system 300 described herein transmits advertised link data 572 to the user device, in some implementations the user device 200 may request data from the advertisement system 500. For example, as depicted by FIG. 1D, the user device 200 may request an image of the UBER® loco to include in an advertised secondary link 570.

Depiction of the search system 300 and the advertisement system 500 as separate systems (e.g., separate computing systems communicating via a network 120) is intended to highlight different functional aspects of the systems 300, 500 and does not necessarily imply that such systems 300, 500 must be realized by separate computing systems. In some implementations, some of the functionality associated with the search system 300 can be performed by the advertisement system 500. Similarly, in some implementations, some of the functionality associated with the advertisement system 500 may be performed by the search system 300. In some cases, functionality associated with the search system 300 and the advertisement system 500 can be implemented by a single computing system or computing systems communicating in a local network, instead of a tong range network, such as the Internet. In some cases the computing system(s) that implement the search system 300 and the advertisement system 500 may be controlled by different parties (e.g., different owners). In other cases, a single owner may implement the search system 300 and some, or all, of the functionality attributed to the advertisement system 500.

Referring to FIGS. 2A and 3A-3C, the user device 200 generates user selectable links 250, 260, 270, 570 based on the received final results 220. Each user selectable link 250, 260, 270, 570 displayed to the user 10 may include an access mechanism 202. The user 10 may select a user selectable link 250, 260, 270, 570 on the user device 200 by interacting with the link 250, 260, 270, 570 (e.g., touching or clicking the link 250, 260, 270, 570). In response to selection of a link 260, 270, 570, the user device 200 may launch a corresponding software application 204 (e.g., a native application 204a or a web-browser application 204b) referenced by the access mechanism 202 and perform one or more operations indicated in the access mechanism 202. The links 250, 260, 270, 570 may include a header 250 associated with an application, a primary link 260 associated with the application, secondary links 270, and advertised secondary links 570.

Access mechanisms 202 may include at least one of a native application access mechanism 202a (hereinafter "application access mechanism"), a web access mechanism 202b, and an application download mechanism 202c. The user device 200 may use the access mechanisms 202 to access functionality of applications 204. For example, the user 10 may select a user selectable link 250, 260, 270, 570 including an access mechanism 202 in order to access functionality of an application 204 indicated in the user selectable link 250, 260, 270, 570. The result combination module 320 may transmit one or more application access mechanisms 202a, one or more web access mechanisms 202b, one or more application download mechanisms 202c, and any corresponding link data 252, 262, 272 to the user device 200 as final results 220.

An application access mechanism 202a may be a string that includes a reference to a native application 204a and indicates one or more operations for the user device 200 to perform. If a user 10 selects a user selectable link 250, 260, 270 including an application access mechanism 202a, the user device 200 may launch the native application 204a referenced in the application access mechanism 202a and perform the one or more operations indicated in the application access mechanism 202a. Put another way, the user device 200 may launch the native application 204a and set the native application 204a into a state that is specified by the application access mechanism 202a. In some examples, an application access mechanism 202a for a restaurant reservation application can include data that causes the user device 200 to launch the restaurant reservation application and assist in making a reservation at a restaurant. In such examples, the restaurant reservation application may be set in a state that displays reservation information to the user 10, such as a reservation time, a description of the restaurant, and user reviews. In additional examples, an application access mechanism 202a for an internet media player application can include data that causes the user device 200 to launch the internet media player application and stream media from the Internet. In such examples, the interact media player application may be set in astute that displays information regarding the media (e.g., music) being streamed, such as a song name, an artist, or an album name.

Application access mechanisms 202a may have various different formats and content. The format and content of an application access mechanism 202a may depend on the native application 204a with which the application access mechanism 202 is associated and the operations that are to be performed by the native application 204a in response to selection of the application access mechanism 202a. For example, an application access mechanism 202a for an internet music player application may differ from an application access mechanism 202a for a shopping application. An application access mechanism 202a for an internet music player application may include references to musical artists, songs, and albums, for example. The application access mechanism 202a for an internet music player application may also reference operations, such as randomizing a list of songs and playing a song or album. An application access mechanism 202a for a shopping application may include references to different products that are for sale. The application access mechanism 202a for the shopping application may also include references to one or more operations, such as adding products to a shopping cart and proceeding to a checkout.

The search system 300 transmits additional data in the final results 220 along with the application access mechanisms 202a. For example, the search system 300 may transmit data with respect to the combined results and the primary and secondary results therein (e.g., link data 252, 262, 272, 572 such as text and/or images), which may be used by the user device 200 to generate user selectable links 250, 260, 270, 572 in the final results 220A, link 250, 260, 270, 570 may include text and/or images that the user 10 may select (e.g., touch) via a user interface 240 displayed on a screen 201 (e.g., a display or touch screen) of the user device 200. Each user selectable link 250, 260, 270, 570 may be associated with an application access mechanism 202a such that when the user 10 selects a link 250, 260, 270, 570, the user device 200 launches the native application 204a referenced in the application access mechanism 202a and performs the one or more operations indicated in the application access mechanism 202a. The text and/or images of a link 250, 260, 270, 570 displayed to the user 10 may indicate the actions that will be performed in response to selection of the link 250, 260, 270, 570. For example, a link 250, 260, 270 can be an image/text describing an action associated with the underlying application state. In a more specific example, if the link 250, 260, 270, 570 is to a song in a music playing application, the text and/or images may indicate that a song that will be played by the music playing application when the user 10 selects the link 250, 260, 270, 570.

The user 10 may select a link 250, 260, 270, 570 to cause the user device 200 to launch the native application 204a identified in the link 250, 260, 270, 570 and perform one or more operations according to the application access mechanism 202a associated with the link 250, 260, 270, 570. Put another way, when the user 10 selects a link 250, 260, 270, 570 the user device 200 launches a native application 204a and sets the native application 204a into a state defined by the application access mechanism 202a associated with the link. In general, a state of a native application 204a may refer to the operations and/or the resulting outcome of the native application 204a in response to selection of a link 250, 260, 270.

A web access mechanism 202b may include a resource identifier that includes a reference to a web resource (e.g., a page of a web application/website). For example, a web access mechanism 202b may include a uniform resource locator (URL) (i.e., a web address) used with hypertext transfer protocol (HTTP). If a user 10 selects a user selectable link 250, 260, 270 including a web access mechanism 202b, the user device 200 may launch the web browser application 204b and retrieve the web resource indicated in the resource identifier. Put another way, if a user 10 selects a user selectable link 250, 260, 270 including a web access mechanism 202b, the user device 200 may launch a corresponding web-browser application 204b and access astute (e.g., a page) of a web application/website. In some examples, web access mechanisms 202b include URLs for mobile-optimized sites and/or full sites. A state of a native application 204a and astute of a web application/website may also be referred to herein generally as an "application state."

The web access mechanism 202b included in an application state record 340 may be used by a web browser to access a web resource that includes similar information and/or performs similar functions as would be performed by a native application 204a that receives an application access mechanism 202a of the application state record 340. For example, the web access mechanism 202b of an application state record 340 may direct the web-browser application 204b of the user device 200 to a web version of the native application 204a referenced in the application access mechanisms 202a of the application state record 340. Moreover, if the application access mechanisms 202 included in an application state record 340 for a specific Mexican restaurant cause each application edition to retrieve information for the specific Mexican restaurant, the web access mechanism 202b may direct the web-browser application 204b of the user device 200 to a web page entry for the specific Mexican restaurant.

An application download mechanism 202c may indicate a location (e.g., a digital distribution platform 130b) where a native application 204a can be downloaded in the scenario where the native application 204a is not installed on the user device 200. If a user 10 selects a user selectable link 250, 260, 270 including an application download mechanism 202a, the user device 200 may access a digital distribution platform from which the referenced native application 204a may be downloaded. The user device 200 may access a digital distribution platform 130b using at least one of the web-browser application 204b and one of the native applications 204a.

In some implementations, an application access mechanism 202a may include an application resource identifier (e.g., a string having an application specific scheme). For example, the application resource identifier may include a reference to a native application 204a, a domain name, and a path to be used by the native application 204a to retrieve and display information to the user 10. In some examples, an application resource identifier is an application specific resource identifier that is defined by the developer of the application 204. In this example, the search application 216 receives the application resource identifier and the operating system 228 may send the application resource identifier to the native application 204a referenced in the application resource identifier. The native application 204a referenced in the application resource identifier launches and is set into the state specified by the application resource identifier.

In some examples, the application access mechanism 202a includes operations for the user device 200 to perform in addition to the operation(s) indicated in the application resource identifier. For example, the search application 216, the operating system 228, and/or a native application 204a on the user device 200 may perform the operations included in the application access mechanism 202a. In some examples, a script includes the operations. Examples of operations may include, but are not limited to, launching a native application 204a, creating and sending a search request 212 (via a search wrapper 210) to an application server 112, setting a current geographic location in a native application 204a, making a restaurant reservation, sending a text message; and adding an appointment to a calendar.

A single native application 204a can provide a variety of different actions. For example, a restaurant reservation application can access reviews for a variety of different restaurants and set up reservations at a variety of different restaurants. Similarly, a travel application can book hotels, book flights, and provide reviews for different travel destinations. The different actions associated with a single native application 204a may be accessed using a plurality of different application access mechanisms 202. For example, with respect to the restaurant reservation application, the search data store 330 may include application state records 340 having different application access mechanisms 202 for accessing different restaurant reviews and setting up reservations. Similarly, the search data store 330 may include application state records 340 having different application access mechanisms 202 for booking hotels, booking flights, and accessing reviews for different travel destinations.

In some examples, the search application 216 may be a native application 204a installed on the user device 200. For example, the search application 216 may receive search queries 212, generate the query wrapper 210, and display received data that is included in the final results 220. In additional examples, the user device 200 may execute a web browser application 204b that accesses a web-based search application. In still more examples, the functionality attributed to the search application 216 may be included as a searching component of a larger application 204 that has additional functionality. For example, the functionality attributed to the search application 216 may be included as part of a native/web-browser application 204a, 204b as a feature that provides search for the native/web-browser application 204a, 204b.

The user device 200 may receive a set of final results 220 (e.g., access mechanisms 202 and/or link data 262, 272, 572 associated with the primary, secondary, and advertised secondary results 222, 224, 524) from the result combination module 320 in response to transmission of the query wrapper 210 to the search system 300. The GUI 240 of the search application 216 displays (e.g., renders) the final results 220 received from the result combination module 320. The search application 216 may display the final results 220 to the user 10 in a variety of different ways, depending on what information is transmitted to the user device 200. In examples where the final results 220 include a list of access mechanisms 202 and link data (e.g., primary link data 262 associated with the primary results 222, secondary link data 272 associated with secondary results 224, and advertised secondary link data 572), the search application 216 may display the final results 220 to the user 10 as a list 251 of user selectable links 260, 270, 570 including text and images. The user selectable links 260, 270, 570 may include primary user-selectable links 260 associated with the primary results 222, secondary user-selectable links 270 associated with the secondary results 224, and advertised secondary user-selectable links 570 associated with the advertised secondary results 524. The text and images in the links 260, 270, 570 may include application names associated with the access mechanisms 202, text describing the access mechanisms 202, images associated with the application 204 referenced by the access mechanisms 202 (e.g., application icons), and images associated with the application state (e.g., application screen images) defined by the access mechanisms 202. The combined results wilt appear as one or more secondary and/or advertised secondary user-selectable link(s) 270, 570 associated with a primary user-selectable link 260. The text and images in the links 260, 270, 570 may additionally indicate the action that will be performed upon selection of the user device. For example, as depicted by FIGS. 1A, 1C, and 1D the primary, secondary, and advertised secondary links 260, 270, 570 include text/images depicting the executable action upon selection of a corresponding link. For example, the primary link 260 includes text indicating the Meal Review Application and Diner 1, conveying to a user that selection of the link will cause the action of opening a review for Diner 1 in the Meal Review Application. As another example, the secondary link 270 corresponding to the action of finding a taxi includes a picture of a car going to a restaurant. With respect to the advertised secondary link 570, the advertised secondary link 570 provides the same action and provides an image of the UBER® logo. The secondary link 270 corresponding to finding coupons is represented by an image of scissors cutting out a coupon. Similarly, the advertised secondary link 570 is represented by the same image but also includes text indicating that the link 570 is an advertisement. The secondary link 270 corresponding to driving directions includes a navigational symbol that a user can understand to indicate their location and direction on a map. This disclosure contemplates the use of any other suitable text and/or images to convey to a user the action that will be performed upon selection of a user-selectable link 250, 260, 270, 570.

In some implementations, the search application 216 displays the final results 220 as a list of primary links 260 arranged under the search field 214 in which the user 10 entered the search query 212, and each primary link 260 may include one or more secondary links 270 and/or advertised secondary links 570 associated with the primary link 260. Moreover, the search application 216 may arrange the primary links 260 in order based on result scores 226 associated with the access mechanisms 202 included in the primary links 260. In addition, the search application 216 may arrange the secondary links 270 and/or advertised secondary links 570 in order based on result scores 226 or functionality. In some examples, the search application 216 groups the primary links 260 together if the primary links 260 are related to the same application 204 displayed in the header 250.

Each of the primary links 260 includes link data 262, and each of the secondary links 270 and/or advertised secondary links 570 includes link data 272, 572. For example, each of the primary, secondary, and/or advertised secondary links 260, 270, 570 includes link data 262, 272, 572, such as an image (e.g., an icon) and text (e.g., an application or business name). Each of the links 260, 270, 570 may include an access mechanism 202 so that if a user 10 selects one of links 260, 270, 570, the user device 200 launches the application and sets the application into a state that is specified by the access mechanism 202 associated with the selected link 260, 270, 570. In some implementations, the user device 200 may arrange the primary links 260 based on result scores associated with the access mechanisms 202 included in the primary links 260. In some implementations, as illustrated in FIG. 2A, primary links 260 for the same application 204 may be combined together in the final results 220 displayed to the user 10, and secondary links 270 for the same primary link 260 are combined together in the final results 220 displayed to the user 10.

Figure 3C:
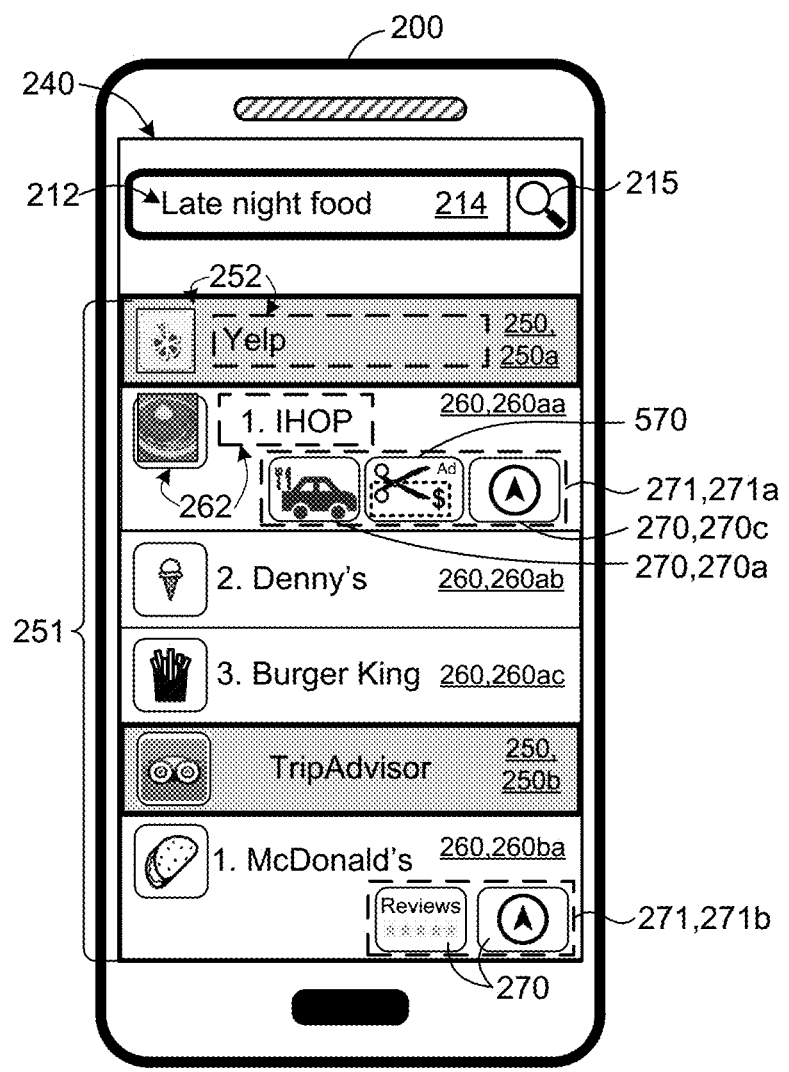

Referring to FIGS. 3A-3C, in general, the 240 displays the secondary links 270 and advertised secondary links 570 in association with the primary links 260 to indicate combined results. The combined results convey via the GUI that the secondary links 270 and advertised secondary links 570 are related to an entity 431 of the primary link 260. For example, a secondary link 270 and/or an advertised secondary link 570 may be displayed proximate to a primary link 260 (e.g., within the same defined area as shown in FIGS. 3A-3C). In an example where the primary links 260 are displayed as a list 251, the secondary links 270 and/or advertised secondary links 570 may be displayed along with the primary links 260 such that a first primary link 260aa and a first set 271a of secondary links 270 and/or advertised secondary links 570 are displayed together, where the secondary links 770 and/or advertised secondary links 570 are displayed either above, below, or adjacent the primary links 260aa. In some examples, a second primary 260ba associated with a second application 250b includes a second set 271b of secondary links 270. Combined results represented in the form of a primary link 260 and one or more secondary links 270 and/or one or more advertised secondary links 570 are contemplated to be displayed in any other reasonable manner.

In some result pages, some primary links 260 may be associated with secondary links 270 and/or advertised secondary links 570 (i.e., may be combined results) while other primary links 260 are not associated with secondary links 270 and/or advertised secondary links 570. In other words, some result pages include both combined results and uncombined results (e.g., primary links 260). Accordingly, a result page includes a plurality of primary links 260, each of which may be associated with 0-N secondary links 270, where N is an integer greater than zero. The primary links 260 that do include at least one secondary link 270 and/or advertised secondary link are based on the combined results determined by the result combination module 320. As shown in FIG. 3A, the secondary links 270 and/or advertised secondary link 570 may be displayed as text (e.g., naming the action associated with the secondary link and/or advertised secondary link 570). Additionally or alternatively, as depicted by FIG. 3B, the secondary links 270 and/or advertised secondary links 570 may be displayed as icons. Other methods of displaying the links are possible as well.

Referring to FIG. 3C, a 240 of a user device 200 displays results 251 for the YELP® application (e.g., web/native) developed by Yelp, Inc., and the TRIPADVISOR® application developed by TripAdvisor, Inc. It may be assumed that the native applications for YELP® and TRIPADVISOR® are installed on the user device 200. Primary links 260aa, 260ab, and 260ac reference the YELP® native application 204a and the primary link 260ba references the TRIPADVISOR® native application 204a. The GUI 240 includes a first header 250a, including the name "Yelp," under which the primary links 260aa, 260ab, 260ac are arranged. The header 250a may indicate that the primary links 260aa, 260ab, 260ac arranged below the header 250a are associated with the YELP® native application 204a. Selection of the primary link 260aa may cause the user device 200 to launch the YELP® native application 204a and retrieve an IHOP® restaurant entry of the YELP® native application 204a. Selection of primary link 260ab may cause the user device 200 to launch the YELP® native application 204a and retrieve a DENNY'S® restaurant entry of the YELP® native application 204a. Selection of primary link 260ba may cause the user device 200 to launch the TRIPADVISOR® native application 204a and retrieve an entry for "McDonald's" in the TRIPADVISOR® native application 204a.

The set 271a of secondary links 270 displayed adjacent the first primary link 260aa of the YELP® application may include a first secondary link 270a (e.g., find taxi to the entity 431 (IHOP®) associated with the primary link 260), a third secondary link 270c (e.g., navigate to the entity 431 (IHOP®) associated with the primary link 260), and a third advertised secondary link 570 (e.g., a couponing application that provides coupons for the entity 431 (IHOP®) associated with the primary link 260). Selection of the first or second secondary links 270a, 570 may cause the user 10 to launch an application (different than the YELP® native application 204a) that executes an action that is different than the actions that the YELP® native application 204a provides the user 10. Selection of the advertised secondary link 570 may cause the user 10 to launch the couponing application that executes an action that is different than the actions that the YELP® native application 204a provides the user 10, which is providing reviews of businesses.

In some examples, user devices 200 communicate with the search system 300 via a partner computing system (not illustrated). The partner computing system may be a computing system of a third party that may leverage the search functionality of the search system 300. The partner computing system may belong to a company or organization other than that which operates the search system 300. Example third parties, which may leverage the functionality of the search system 300 may include, but are not limited to, internet search providers and wireless communications service providers. The user devices 200 may send search queries to the search system 300 and receive results via the partner computing system. The partner computing system may provide a user interface to the user devices 200 in some examples and/or modify the search experience provided on the user devices 200.

Referring back to FIG. 1B, the data sources 130 may be sources of data, which the search system 300 may use to generate and update the search data store 330. For example, an application state record generation module (not shown) of the search system 300 may generate/update application state records 340 based on data retrieved from the data sources 130. The data retrieved from the data sources 130 can include any type of data related to application functionality and/or application states. Data retrieved from the data sources 130 may be used to create and/or update one or more databases, indices, tables (e.g., an access table), files, or other data structures included in the search data store 330. For example, application state records 340 may be created and updated based on data retrieved from the data sources 130. In some examples, some data included in a data source 130 may be manually generated by a human operator. Data included in the application state records 340 may be updated over time so that the search system 300 provides up-to-date results.

The data sources 130 may include a variety of different data providers. The data sources 130 may include data from application developers 130a, such as application developers' websites and data feeds provided by developers. The data sources 130 may also include operators of digital distribution platforms 130b configured to distribute native applications 204a to user devices 200 (e.g., GOOGLE PLAY® digital distribution platform by Google, Inc., the APP STORE® digital distribution platform by Apple, Inc., and WINDOWS PHONE® Store developed by Microsoft Corporation).

The data sources 130 may also include other websites, such as websites that include web logs 130c (i.e., blogs), application review websites 130d, or other websites including data related to applications. Additionally, the data sources 130 may include social networking sites 130e, such as "FACEBOOK®" by Facebook, Inc. (e.g., Facebook posts) and "TWITTER®" by Twitter Inc, (e.g., text from tweets). Data sources 130 may also include online databases 130f that include, but are not limited to, data related to movies, television programs, music, and restaurants. Data sources 130 may also include additional types of data sources in addition to the data sources described above. Different data sources 130 may have their own content and update rate.

Figures 4A, 4B:
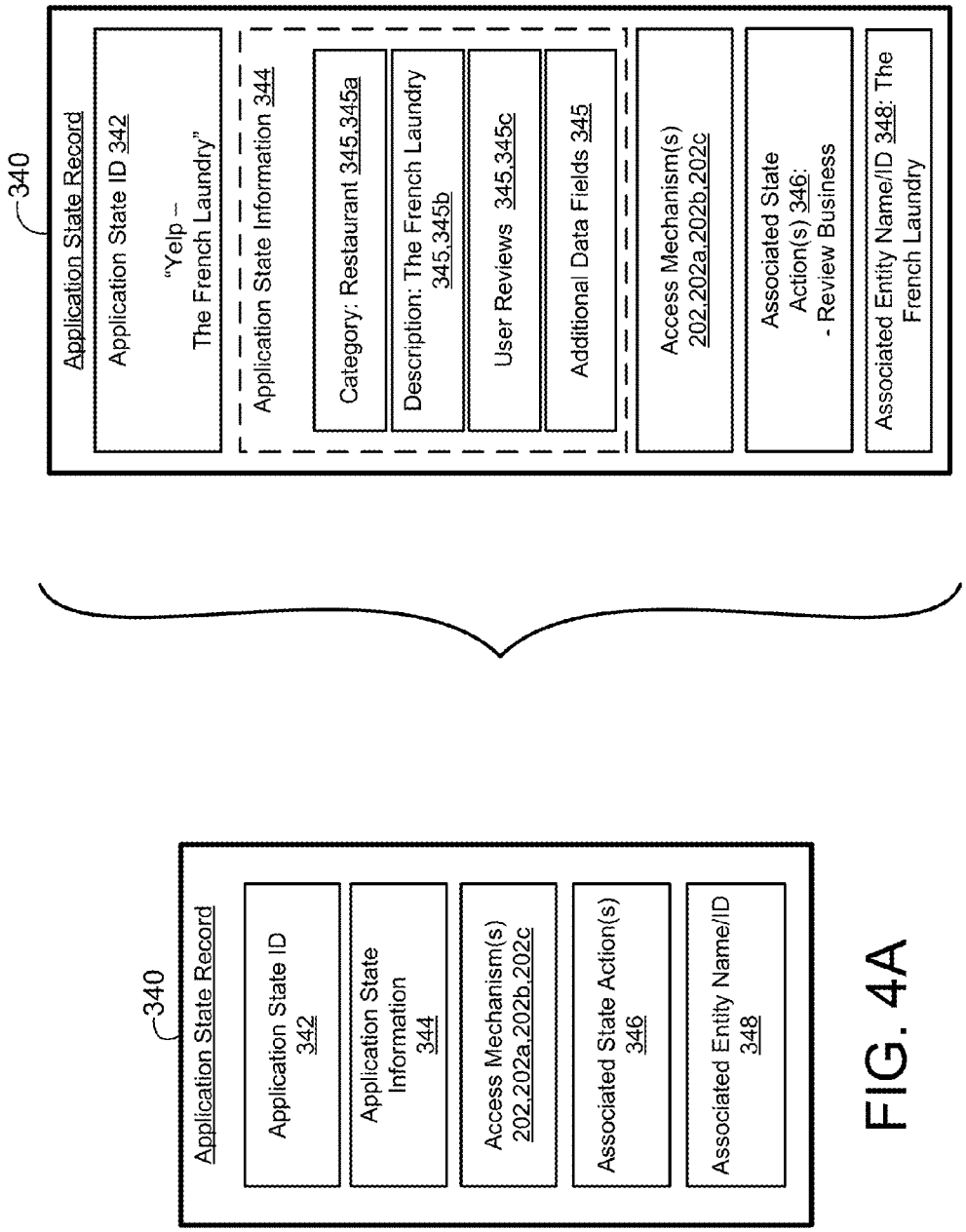
FIGS. 4A and 4B are schematic views of an example application state record.

Referring to FIGS. 4A and 4B, the search data store 330 includes a plurality of different application state records 340. Each application state record 340 may include data related to a state of the application. An application state record 340 may include an application state identifier (ID) 342, application state information 344, one or more access mechanisms 202, 202a, 202h, 202c used to access functionality provided by the application 204, associated state actions(s) 346, and an associated entity name/identifier (ID) 348.

The application state ID 342 may be used to identify the application state record 340 among the other application state records 340 included in the search data store 330. The application state ID 342 may be a string of alphabetic, numeric, and/or symbolic characters (e.g., punctuation marks) that uniquely identifies the associated application state record 340. In some examples, the application state II) 342 describes a function and/or an application state in human readable form. For example, the application state ID 342 may include the name of the application 204 referenced in the access mechanism(s) 202. In some examples, the application state ID 342 includes a string in the format of a uniform resource locator (URL) of a web access mechanism 202b for the application state record 340, which may uniquely identify the application state record 340.

In a more specific example, if the application state record 340 describes a function of the YELP® native application 204a, the application state ID 342 may include the name "Yelp" along with a description of the application state described in the application state information 344. For example, the application state ID 342 for an application state record 340 that describes the restaurant named "The French Laundry" may be "Yelp—The French Laundry." In an example where the application state ID 342 includes a string in the format of a URL, the application state ID 342 may include the following string "http://www.yelp.com/biz/tho-french-laundry-yountville-2?ob=1" to uniquely identify the application state record 340. In additional examples, the application state ID 342 may include a URL using a namespace other than "http://."

The application state information 344 may include data that describes an application state into which an application 204 is set according to the access mechanism(s) 202 in the application state record 340. The application state information 344 can include text, numbers, and symbols that describe the application state. The application state information 344 may include a variety of different types of data, such as structured, semi-structured, and/or unstructured data. The application state information 344 may be automatically and/or manually generated based on documents retrieved from the data sources 130. Moreover, the application state information 344 may be updated so that up-to-date final results 220 can be provided in response to a search query 212.

The types of data included in the application state information 344 may depend on the type of information associated with the application state. For example, if the application state record 340 is for an application 204 that provides reviews of restaurants, the application state information 344 may include information (e.g., text and numbers) related to a restaurant, such as a category of the restaurant, reviews of the restaurant, and a menu for the restaurant. In this example, the access mechanism(s) 202 may cause the application 204 (e.g., a native application 204a or a web-browser application 204b) to launch and retrieve information for the restaurant. As another example, if the application state record 340 is for an application 204 that plays music, the application state information 344 may include information related to a song, such as the name of the song, the artist, lyrics, and listener reviews. In this example, the access mechanism(s) 202 may cause the application 204 to launch and play the song described in the application state information 344.

The search system 300 may generate application state information 344 included in an application state record 340 in a variety of different ways. In some examples, the search system 300 retrieves data to be included in the application state information 344 via partnerships with database owners and developers of native applications 204a. For example, the search system 300 may automatically retrieve the data from online databases 130f that include, but are not limited to, data related to movies, television programs, music, and restaurants. In some examples, a human operator manually generates some data included in the application state information 344. The search system 300 may update data included in the application state information 344 over time so that the search system 300 provides up-to-date final results 220.

The example application state information 344 of FIG. 4B includes data fields 345, such as a category 345a of THE FRENCH LAUNDRY® restaurant, a description 345b of THE FRENCH LAUNDRY® restaurant, user reviews 345c of THE FRENCH LAUNDRY® restaurant, and additional data fields 345. The restaurant category 345a field may include the text "French cuisine" and "contemporary," for example. The description field 345b may include text that describes THE FRENCH LAUNDRY® restaurant. The user reviews field 345c may include text of user reviews for THE FRENCH LAUNDRY® restaurant. The additional data fields 345 may include additional data for THE FRENCH LAUNDRY® restaurant that may not specifically fit within the other defined fields, such as a menu for the restaurant, prices, and operating hours for the restaurant.

The associated state action(s) 346 identifies one or more actions associated with each one of the application access mechanism(s) of the application state record 340. For example, if the application state record 340 is for an application that provides restaurant reviews, then the associated state action 346 may be "Review Business." As another example, if the application state record 340 is for an application that provides direction to a location, then the associated state action 346 may be "Navigate To." As an example, shown in FIG. 4B, the associated state actions 346 for the application state record 340 of the Yelp application may be "Review Business."

The associated entity name/ID 348 identifies an entity 431 associated with the application access mechanism(s) 202. For example, if the application state record 340 is for an application that provides restaurant reviews, then the associated entity name/ID 348 may be the name of the restaurant. As another example, if the application state record 340 is for an application that provides direction to a location, then the associated entity name/ID 348 may be the location to which the application navigates. As an example, the associated entity name/ID 348 for the application state record 340 shown in FIG. 4B is "The French Laundry," which is the name of the restaurant entity 431 associated with the state accessed by the access mechanism 202.

In some implementations, an application state record 340 includes multiple different application access mechanisms 202, 202a, 202b, 202c corresponding to different application editions e.g., different application versions and different native applications on different operating systems and devices). The application access mechanism 202 may include edition information that indicates the application edition with which the application access mechanism 202 is compatible. The different application access mechanisms 202 included in an application state record 340 may cause the corresponding application editions to launch and perform similar functions. Accordingly, the different application access mechanisms 202 included in an application state record 340 may cause the corresponding application editions to be set into similar application states. For example, if the different application access mechanisms 202 reference different editions of an information retrieval application, the different application access mechanisms 202 may cause the corresponding application editions to retrieve similar information. In another example, if the different application access mechanisms 202 reference different editions of an internet music player application, the different application access mechanisms 202 may cause the corresponding application editions to play the same song.

Referring to FIGS. 5A and 5B, the entity data store 420 includes a plurality of different entity records 430. Each entity record 430 may include data related to an entity 431. An entity 431 may refer to a person, a place, or a thing. For example, an entity 431 may refer to a business, a product, a service, a piece of media content, apolitical organization/figure, a public figure, a destination, or another suitable item of commerce. Accordingly, in some cases, an entity 431 can be a place with a geolocation (e.g., restaurants, bars, gas stations, supermarkets, movie theaters, doctor offices, parks, and libraries, etc.). An entity record 430 may include an entity name/identifier (ID) 432 (hereinafter entity ID 432), entity location data 436 (e.g., geolocation data), an entity category 438 (and optionally one or more sub-categories 438a-438n), entity information 434, and associated entity actions 440.

The entity ID 432 may be used to identify the entity record 430 among the other entity records 430 included in the entity data store 420. The entity ID 432 may be a string of alphabetic, numeric, and/or symbolic characters (e.g., punctuation marks) that uniquely identifies the associated entity record 430. In some examples, the entity ID 432 describes the entity 431 in human readable form.

In a more specific example, if the entity record 430 describes a restaurant named Qdoba® (QDOBA is a registered trademark of Qdoba Restaurant Corporation), the entity ID 432 for the entity record 430 can be "Qdoba." As another example, the entity ID 432 may include the following string "Qdoba, 42967 Woodward Avenue, Bloomfield Township, Mich. 48304" to uniquely identify the entity record 430. Other unique identifiers are possible as well, such as a store number.

The entity information 434 may include any information about the entity 431, such as text (e.g., description, reviews) and numbers (e.g., number of reviews). The entity information 434 may include a variety of different types of data, such as structured, semi-structured, and/or unstructured data. Moreover, the entity information 434 may be automatically and/or manually generated (e.g., by the entity record generation module 410) based on documents retrieved from the data sources 130. In some examples, the entity information 434 includes data that may be presented to the user 10 by an application 204 when the application 204 is set in the application state defined by the access mechanism(s) included in the entity record 430.

The entity location data 436 may include data that describes a location of the entity 431. This data may include a geolocation (e.g., latitude and longitude coordinates), a street address, or any information that can be used to identify the location of the entity 431 within a geographical area. In some implementations, the entity location data 436 may define a geo-location associated with the application state record 340 that is associated with the entity record 430 (e.g., one or more access mechanisms that are the same/similar as the access mechanisms of the application state record 340).

The entity category 438 provides a classification or grouping of the entity 431. Moreover, the entity category can have one or more sub-categories to further classify the entity 431. For example, the entity record 430 could have an entity category 438 of "restaurant" and a sub-category 438a indicating a type of cuisine, such as "French cuisine" or "contemporary." Any number of subcategories 438a-438n may be assigned to classify the entity 431.

The associated entity action(s) field 440 provides one or more access mechanisms 202 and actions associated with the entity ID 432. Each access mechanism 202 of the associated entity action 440 corresponds to an action. In some implementations, each of the access mechanism/action pairs can be associated with different applications. In some cases, multiple different access mechanism/action pairs can be associated with the same application. FIG. 5B illustrates an example entity record 430 for a restaurant entity "Qdoba." The associated entity actions (s) 440 may include an access mechanism 202 for the OPENTABLE® application 204 (developed by OpenTable, Inc) which has an associated action of "Make Restaurant Reservation" for the "Qdoba" entity Another associated access mechanism/action pair may be for the YELP® application. In this case, the access mechanism is for YELP® and the associated action is "Provide Reviews." The entity record 430 may include additional access mechanism/action pairs for the Qdoba entity, such as access mechanisms for applications that provide cab rides to the Qdoba entity (i.e., a "get cab" action).

The search system 300 may use the data included in the application state records 340 and the entity records 430 to identify secondary results 224. The search system 300 can identify application state records 340 corresponding to primary results 222 using a received search query 212. Using the information provided in the application state records 340 of the primary results 222, particularly the associated entity names/IDs 348, the search system 300 can identify entity records 430 corresponding to the primary results 222. The search system 300 may compare the associated state actions 346 of the application state records 340 with the associated entity actions 440 of the entity records 340 to identify access mechanisms corresponding to application states with the same entity, but different actions than the application states of the primary results 222. More specifically, the search system 300 can select associated entity actions 440 of the entity records 340 that do not appear in the associated state actions 346 of the application state records 340. The application state records 340 and entity records 430 described herein are for illustration purposes. For example, application state records 340 and entity records 430 illustrate the relationship between data associated with different applications/websites, entities, and actions. As such, it is contemplated that data represented by the application state records 340 and entity records 430 may be stored in a variety of different formats that may be different than that described herein.

Figure 6A:
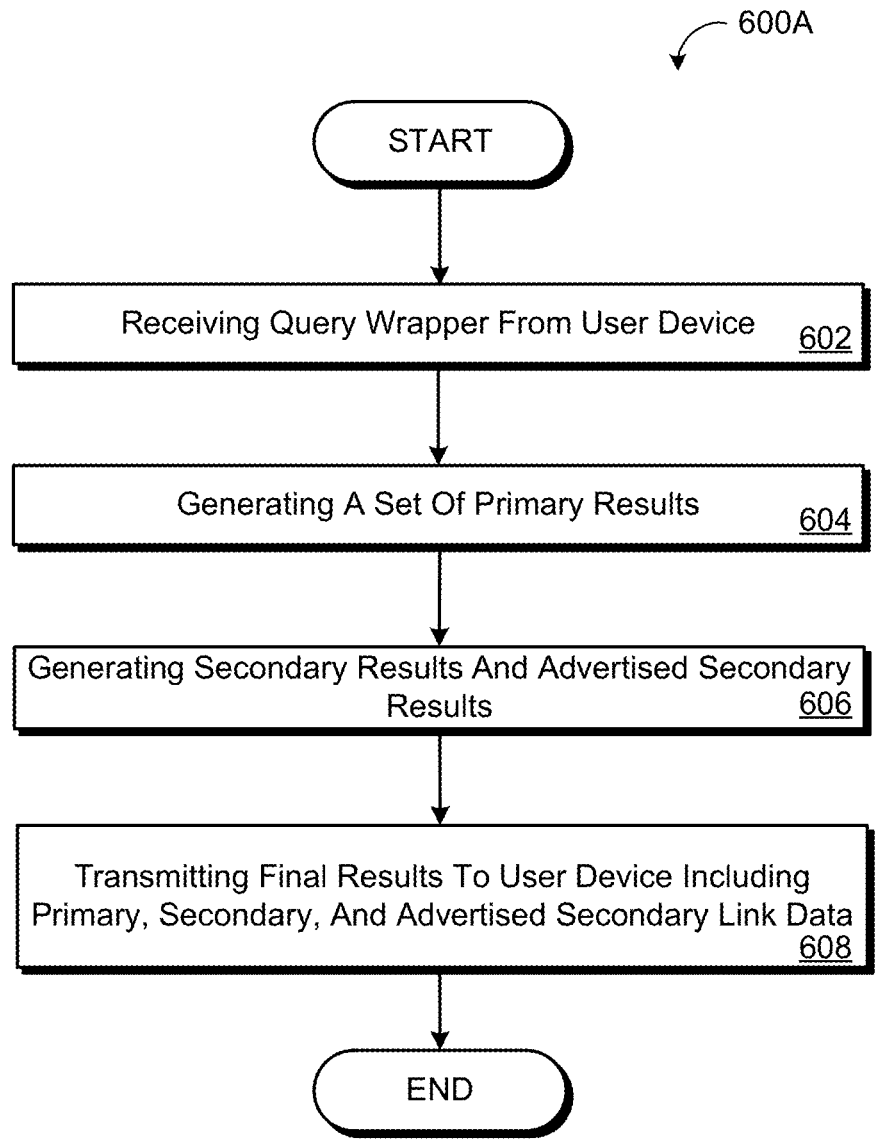
FIGS. 6A and 6B are schematic views illustrating example methods of generating results.

FIG. 6A provides an example arrangement of operations for a method 600A of performing a search using the search system 300 of FIG. 2B. At block 602, the search system 300 receives a query wrapper 210 from a user device 200. At block 604, the search system 300 generates a set of (primary results 222 based on the received query wrapper 210. At block 606, the search system 300 generates secondary results 224 based on entity records 430 retrieved from an entity data store 430 and advertised secondary results 524 based on advertisement results 522. The secondary results 224 and advertised secondary results 524 are based on an action associated with one of the primary results 222 and an entity of the primary result 222. For example, a secondary result 224 and an advertised result 524 may be associated with the same entity as the primary result 222 and a different action than the primary result 222. At block 608, the search system 300 transmits final results 220 including the primary results 222, secondary results 224, and advertised secondary results 524 to a user device 200. The final results 220 include primary link data 262, secondary link data 272, and advertised secondary link data 572.

Figure 6B:
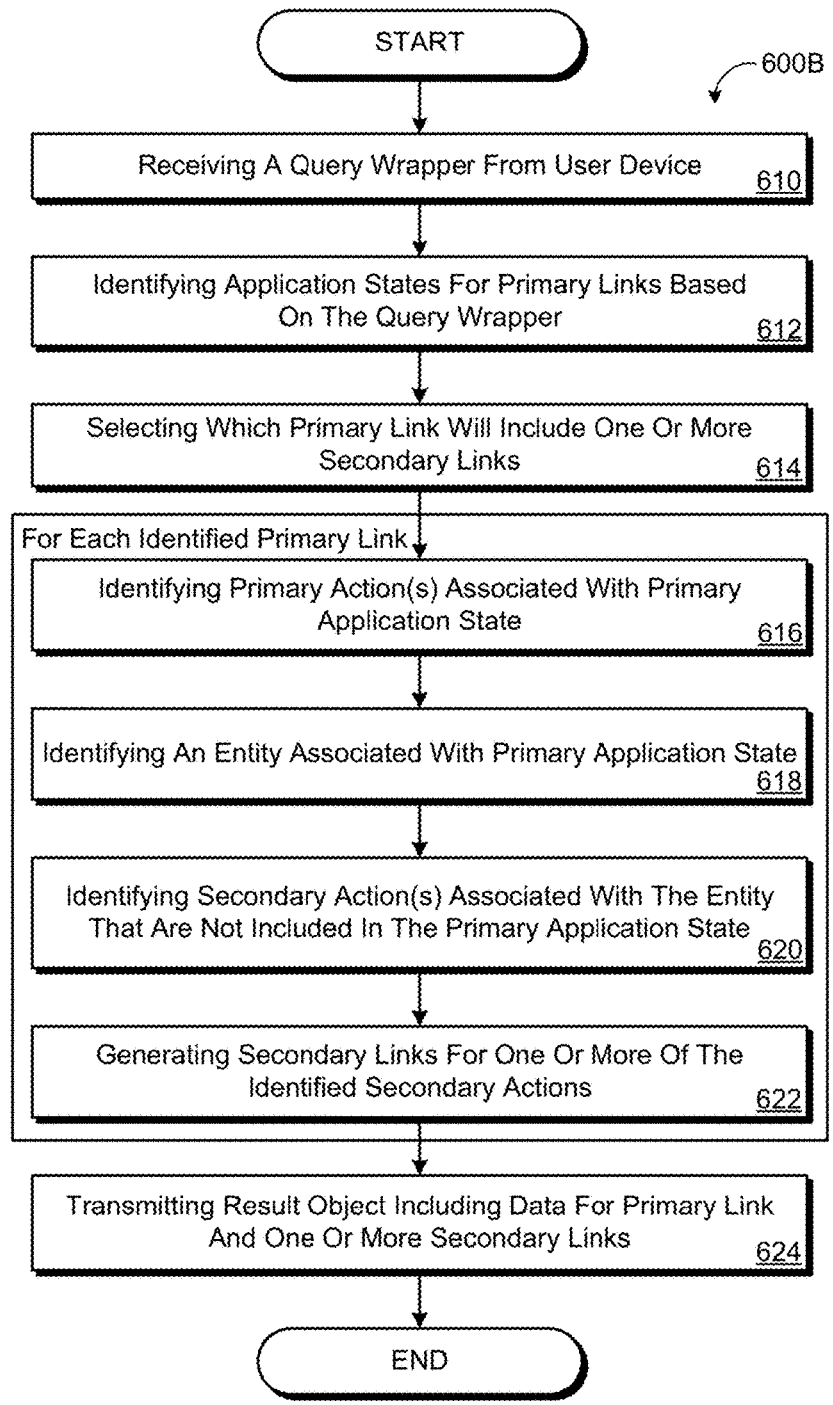

FIG. 6B provides amore detailed example arrangement of operations for a method 600B of performing a search using the search system 300 of FIGS. 2A and 2B. The example methods of FIGS. 10 and 11A-11B discuss the generation of advertised secondary links 570 in detail. At block 610, the search system 300 receives a query wrapper 210 from a user device 200. The query wrapper 210 includes information, such as a search query 212, geo-location data 206, platform data 208, and an IP address 209. Other information may also be included in the query wrapper 210. At block 612, the search system 300 identifies application states for primary links 260 based on the received query wrapper 210. At block 614, the search system 300 selects which of the one or more primary links will include one or more secondary links 270, 570. The search system 300 may determine whether to include secondary links 270, 570 on a per-primary link basis. In some examples, the search system 300 may only include secondary links 270, 570 in some of the primary links 260 (e.g., a threshold number or the top N scoring primary links). In other examples, the search system 300 can insert secondary links 270, 570 in all of the primary links 260 (in the case where one or more secondary links 270, 570 are available for each primary link 260). At block 616, for each identified primary link 260, the search system 300 identifies a primary action associated with the primary application state. The search system 300 identifies the primary action by identifying the state action 346 (FIGS. 4A and 4B) associated with the application state record 340 of the application state. A primary state may have one or more actions, or zero actions in some examples. For example, an application 204 may only provide reviews or may provide reviews and also navigate to the location or business it is providing reviews for, i.e., an entity 431.

At block 618, for each identified primary link 260, the search system 300 identifies an entity 431 associated with the primary application state. In some examples, to identify the entity 431 associated with a primary link 260, the search system 300 (e.g., via the secondary result generation module), may access the application state record 340 associated with the primary link 260. In this way, the search system 300 can identify the entity name/ID associated with the primary link 260 based on the associated entity name/ID 348 of the application state record 340 corresponding to the (primary link 260. A primary state may have one or more associated entities (or zero entities in some cases). At block 620, for each identified primary link 260, the search system 300 identifies one or more secondary actions associated with the entity 431 that is associated with the primary application state. The identified secondary actions are different than actions of the primary application state. In some examples, the application state actions 346 of an application state record 340 of the primary link 260 are compared to the entity actions 440 (FIGS. 5A and 5B), and only the entity actions 440 that are different from the application state actions 348 may be identified as secondary actions. For example, referring to FIG. 4B, a state record 340 corresponding to a state related to THE FRENCH LAUNDRY® restaurant includes an associated state action 346 "Review Business." A corresponding entity record 430 for THE FRENCH LAUNDRY® may include one or more actions including "Review Business," "Make reservations, "Get Cab," and "Get Limo." In this example, the secondary links 270 may include any one of the actions provided by the entity record 430 except the "Review Business" action.

At block 622, the search system 300 generates secondary links 270 for one or more of the identified secondary actions by retrieving secondary link data 272 from the data store 340, 430. With respect to advertised secondary links 572, the search system 300 may generate advertised secondary links 572 by retrieving link data 572 based on advertisement results 522 (see FIGS. 11A-11B). At block 624, the system 300 transmits final results 220 that include primary link data 262 allowing a GUI 2.40 of a user device 200 to display the primary link(s) 260, and secondary link data 272, 572 allowing the GUI 240 to display the secondary link(s) 270, 570.

Figure 7:
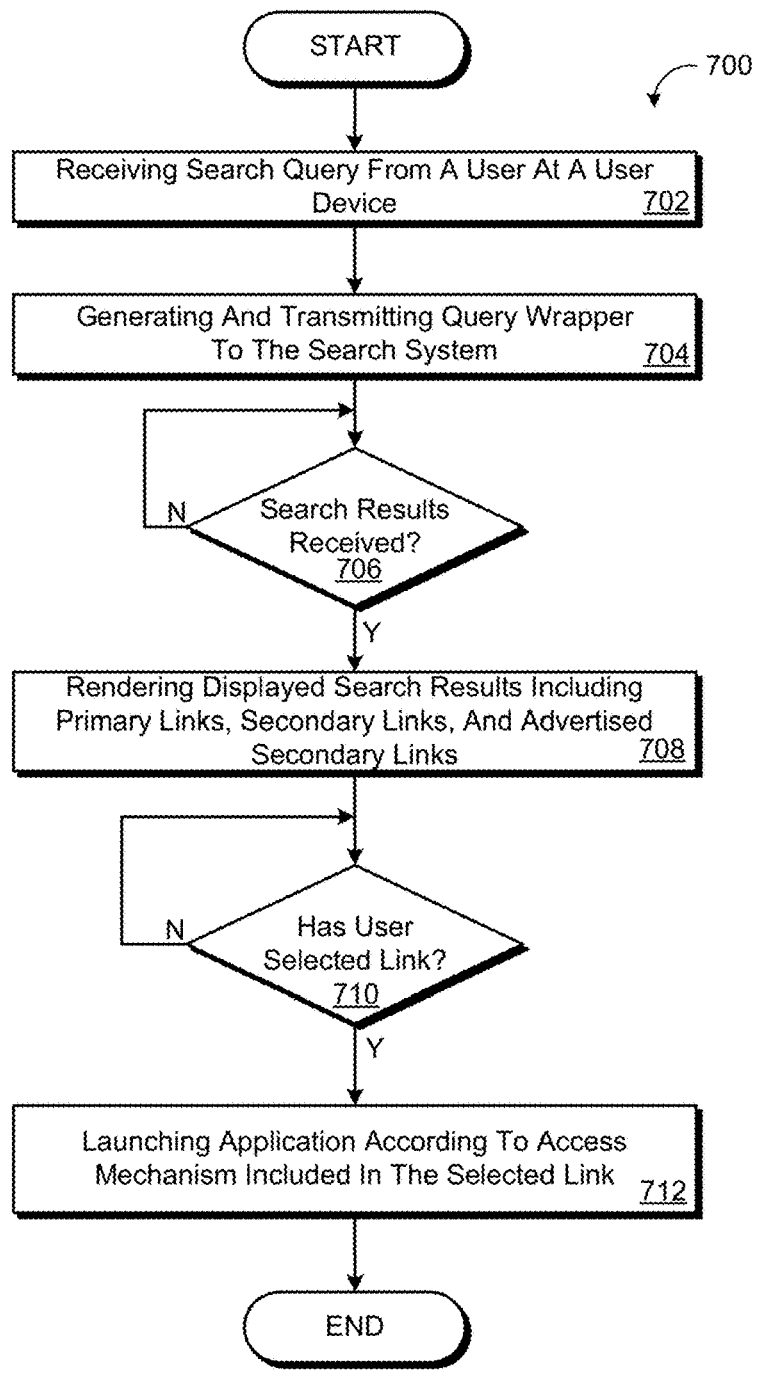
FIG. 7 is a schematic view illustrating an example method of performing a search on a user device.

FIG. 7 provides an example arrangement of operations for a method 700 of receiving a user's search query, receiving search results including primary and secondary links 260, 270, and displaying the received search results. At block 702, the method 700A includes receiving a search query 212 from a user at the user device 200. At block 704, the method includes generating a query wrapper 210 and transmitting it to the search system 300. At decision block 706, the method includes determining if final results 220 are received from the search system 300. At block 708, and after the final results 220 are received, the method 700 includes rendering links 250, 260, 270, 570 associated with received final results 220. The received final results 220 include primary link data 262 for displaying a primary links 260 and secondary link data 272, 572 for displaying a secondary links 270. At block 710, the method 700 determines when a user selects a link 260, 270, 570. At block 712, when the user 10 selects a link 260, 270, 570, the method 700 includes launching an application 204 according to the access mechanism 202 included in the selected link 260, 270, 570.

FIG. 10A provides an example arrangement of operations for a method 1000 for generating advertisement records 530. At block 1002, the advertisement record generation module 550 generates a GUI for a campaign manager and transmits the GUI to an advertiser device 50 in a manner that allows the advertiser to input data values for the parameters of an advertisement record 530. For example, as depicted by FIG. 1E, a campaign manager GUI may provide input fields for data values that correspond to data that may be used to populate an advertisement record 530. At block 1004, the advertisement record generation module 550 receives the data values input by an advertiser for an advertisement record 530. At block 1006, the advertisement record generation module 550 generates an advertisement record 530 based on the received data. At block 1008, the advertisement record generation module 550 stores the generated advertisement record 530 in the advertisement data store 520.

Figure 11A:
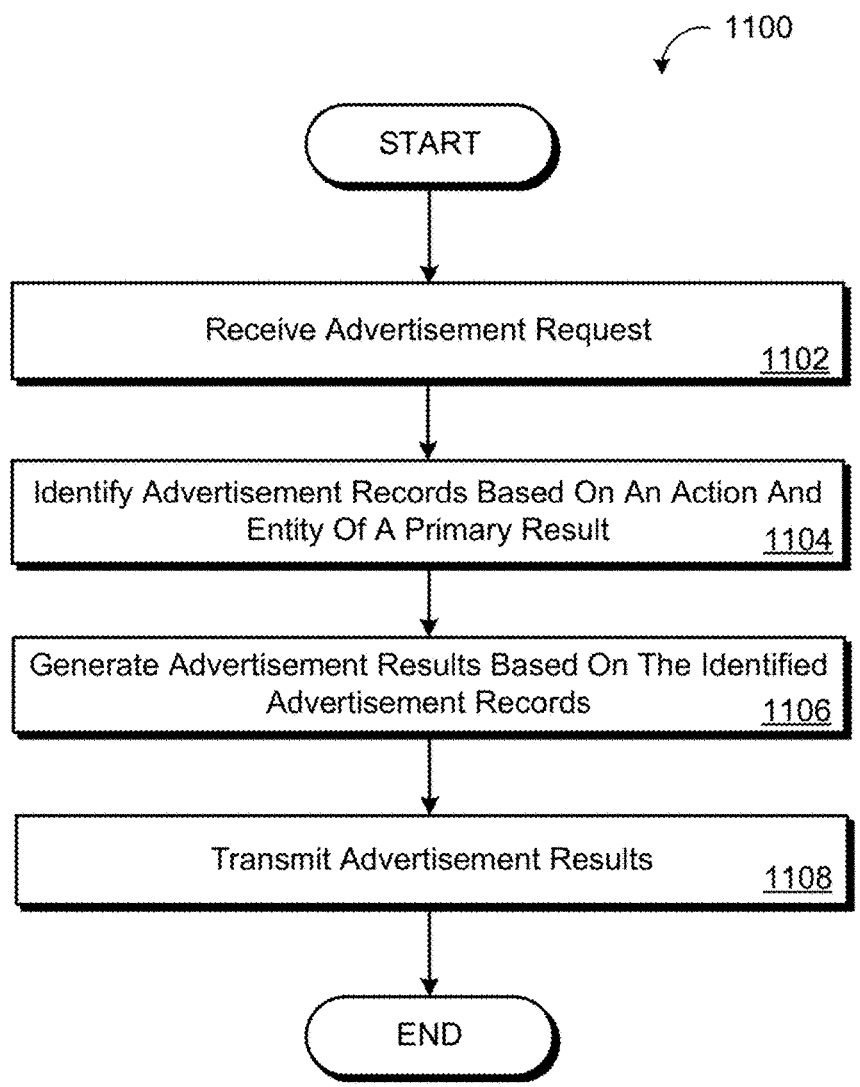
FIGS. 11A and 11B are schematic views of example methods for generating advertisement results.

FIG. 11A provides an example arrangement of operations for a method 1100 for generating advertisement results 522 based on an advertisement request 512 including an action and entity of a primary result 222. At block 1102, the advertisement module 510 receives an advertisement request 512 (e.g., from the result combination module 320). At block 1104, the advertisement module 510 identifies potential advertisements (e.g., advertisement records 530) based on the action and entity of the primary result 222. The advertisement module 510 identifies advertisement records 530 from the advertisement data store 520 corresponding to potential advertised secondary links 570 with the same entity but different actions than the entity and action of the primary result 222. At block 1106, the advertisement module 510 generates advertisement results 522 based on one or more of the identified advertisement records 530. At block 1108, the advertisement module 510 transmits advertisement results 522 (e.g., to the result combination module 320). The result combination module 320 may insert the advertisement results 522 into combined results for rendering and display in a SERP.

Figure 11B:
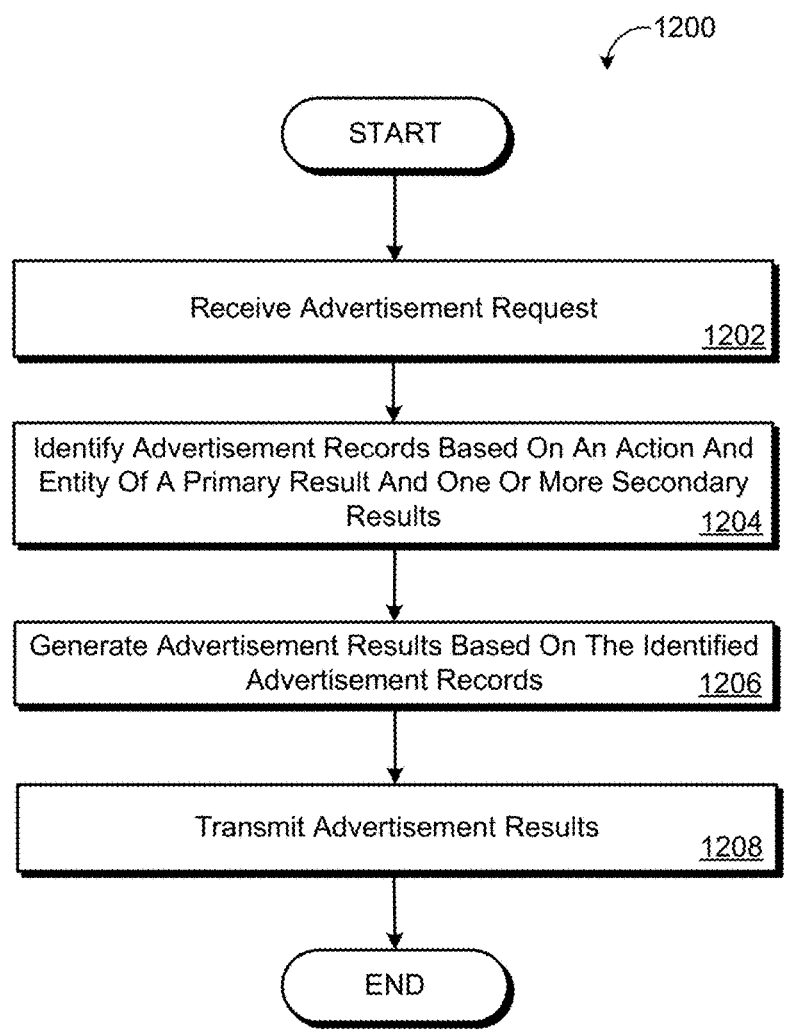

FIG. 11B provides an example arrangement of operations for a method 1200 for generating advertisement results 522 based on an advertisement request 512 including both an action and entity of a primary result 222 and one or more entities associated with one or more secondary results 224. At block 1202, the advertisement module 510 receives an advertisement request 512 from the result combination module 320. The advertisement request 512 may include data related to one or more secondary results 224 that the result combination module 320 may include in a combined result. At block 1204, the advertisement module 510 identifies potential advertisements (e.g., advertisement records 530) based on the action and entity of the primary result 222 and based on the secondary results 224 of the advertisement request 512. More specifically, the advertisement module 510 determines which, if any, of the secondary results 224 correspond to an advertisement record 530 (i.e., which of the secondary results 224 present an advertisement opportunity). At block 1206, the advertisement module 510 generates advertisement results 522 based on the identified advertisement records 530. At block 1208, the advertisement module 510 transmits the generated advertisement results 522 to the result combination module 320, which can then include the advertisement results 522 in a combined result for render and display in a SERP. In some examples, the generated advertisements 522 may indicate which secondary results 224 of the advertisement request 512 to advertise rather than data that can be used to render an advertisement.

Figure 8:
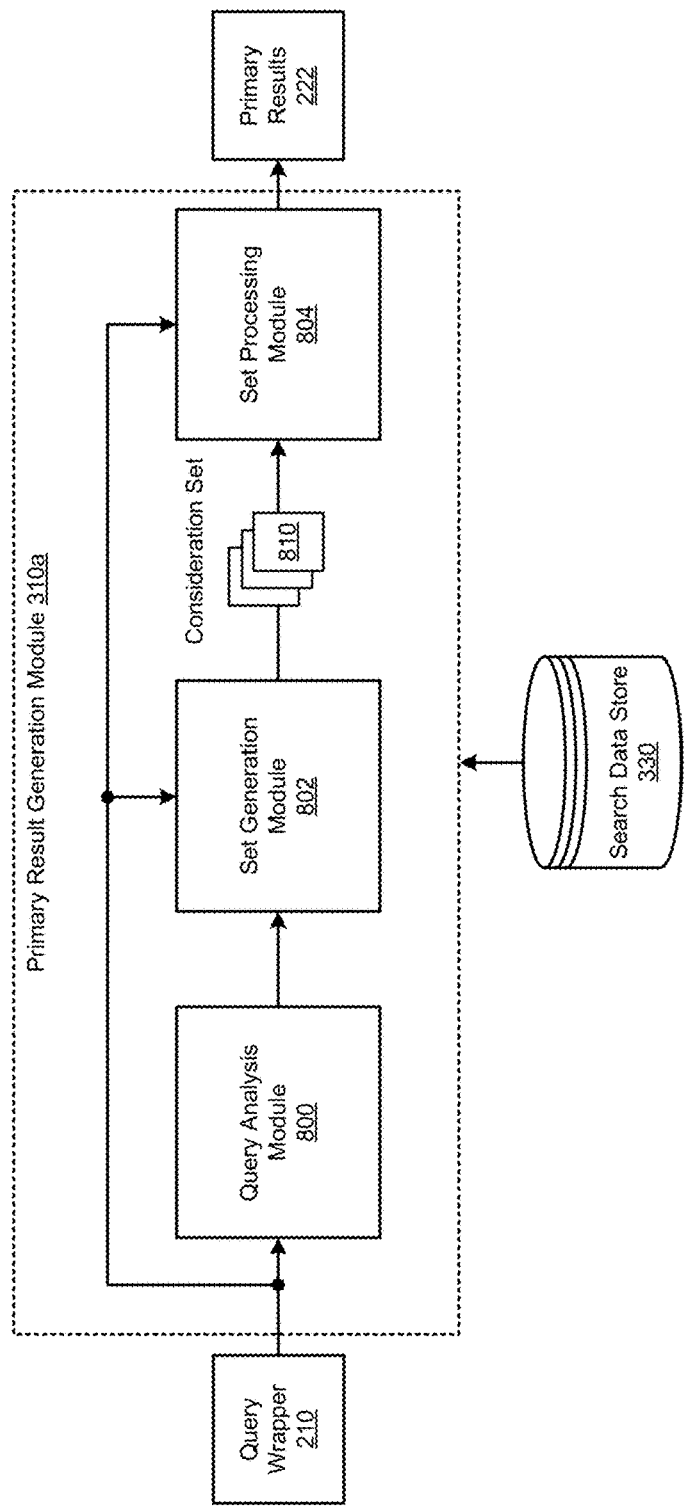
FIG. 8 is a functional block diagram of an example primary result generation module.

As indicated above, an organic set of search results (i.e., the primary results 222), may be generated in any reasonable manner. FIG. 8 and the accompanying description below describe an example technique for generating a set of organic search results that may later be supplemented by secondary links 270 using the techniques described herein. FIG. 8 depicts an example primary result generation module 310a that includes a query analysis module 800, a consideration set generation module 802 (hereinafter "set generation module 802"), and a consideration set processing module 804 thereinafter "set processing module 804"). The query analysis module 800 receives the query wrapper 210 and analyzes the received search query 212. The query analysis module 800 may perform various analysis operations on the received search query 212, which may include, but are not limited to, tokenization of the search query 212, filtering of the search query 212, stemming, synonymization, and stop word removal. In some implementations, the query analysis module 800 detects a query-specified location included in the search query 212.

The set generation module 802 identifies a plurality of application state records 340 based on the received search query 212. In some examples, the set generation module 802 identifies the application state records 340 based on matches between terms of the search query 212 and terms in the application state records 340. For example, the set generation module 802 may identify the application state records 340 based on matches between tokens generated by the query analysis module 800 and words included in the application state records 340, such as words included in the application state IDs 342 and/or the application state information 344.

The consideration set 810 of application state records 340 may refer to the application state records 340 that are to be scored by the set processing module 804. The set generation module 802 may determine the geo-location of the user device 200 based on data included in the query wrapper 210. In additional examples, if the query analysis module 800 detects a query-specified location, the set generation module 802 uses the query-specified location as the search location. In some examples, the set generation module 802 uses the geo-location of the user device 200 as the search location (e.g., to filter application state records 340 based on location).

The set processing module 804 may score the application state records 340 in the consideration set 810 in order to generate a set of primary results 222 220. The scores 226 associated with the application state records 340 may be referred to as "result scores." The set processing module 804 may determine a result score 226 for each of the application state records 340 in the consideration set 810. The result scores 226 associated with an application state record 340 may indicate the relative rank of the application state record 340 (e.g., by the access mechanisms 202) among other application state records 340. For example, a larger result score 226 may indicate that an application state record 340 is more relevant to the received search query 212.

The set processing module 804 selects application access mechanisms 202 from the selected application state records 340 (e.g., the highest scoring function records). The set processing module 804 transmits the selected application access mechanisms 202 to the user device 200 that generated the search query 212. The set processing module 804 may also transmit the result scores 226 associated with the selected application access mechanisms 202. For example, an application access mechanism 202 may be associated with the result score 226 of the application state record 340 from which the application access mechanism 202 was selected.

The information conveyed by the primary results 222 may depend on how the result scores 226 are calculated by the set processing module 804. For example, the result scores 226 may indicate the relevance of an application state. The set processing module 804 may generate result scores 226 for application state records 340 in a variety of different ways. In some implementations, the set processing module 804 generates a result score 226 for an application state record 340 based on one or more scoring features. The scoring features may be associated with the application state record 340 and/or the search query 212. An application record scoring feature (hereinafter "record scoring feature") may be based on any data associated with an application state record 340. For example, record scoring features may be based on any data included in the application state information 344 of the application state record 340. Example record scoring features may be based on metrics associated with a person, place, or thing described in the application state record 340. Example metrics may include the popularity of a place described in the application state record 340 and/or ratings (e.g., user ratings) of the place described in the application state record 340. For example, if the application state record 340 describes a song, a metric may be based on the popularity of the song described in the application state record 340 and/or ratings (e.g., user ratings) of the song described in the application state record 340. The record scoring features may also be based on measurements associated with the application state record 340, such as how often the application state record 340 is retrieved during a search and how often access mechanisms 202 of the application state record 340 are selected by a user 10.

A query scoring feature may include any data associated with the search query 212. For example, query scoring features may include, but are not limited to, a number of words in the search query 212, the popularity of the search query 212, and the expected frequency of the words in the search query 212. A record-query scoring feature may include any data generated based on data associated with both the application state record 340 and the search query 212 that resulted in identification of the application state record 340 by the set generation module 802. For example, record-query scoring features may include, but are not limited to, parameters that indicate how well the terms of the search query 212 match the terms of the application state information 344 of the identified application state record 340. The set processing module 804 may generate a result score 226 for an application state record 340 based on at least one of the record scoring features, the query scoring features, and the record-query scoring features.

The set processing module 804 may determine a result score 226 for an application state record 340 based on one or more of the scoring features listed herein and/or additional scoring features not explicitly listed. In some examples, the set processing module 804 may include one or more machine learned models (e.g., a supervised learning model) configured to receive one or more scoring features. The one or more machine learned models may generate result scores 226 based on at least one of the record scoring features, the query scoring features, and the record-query scoring features. For example, the set processing module 804 may pair the search query 212 with each application state record 340 and calculate a vector of features for each (query, record) pair. The vector of features may include one or more record scoring features, one or more query scoring features, and one or more record-query scoring features. The set processing module 804 may then input the vector of features into a machine-learned regression model to calculate a result score for the application state record 340. In some examples, the machine-learned regression model may include a set of decision trees e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels.

The result scores 226 associated with the application state records 340 (e.g., access mechanisms 202) may be used in a variety of different ways. The set processing module 804 and/or the user device 200 may rank the access mechanisms 202 based on the result scores 226 associated with the access mechanisms 202. In these examples, a larger result score may indicate that the access mechanism 202 (e.g., the application state) is more relevant to a user than an access mechanism 202 having a smaller result score. In examples where the user device 200 displays the primary results 222 as a list, the user device 200 may display the links 260 for access mechanisms 202 having larger result scores 226 nearer to the top of the results list (e.g., near to the top of the screen). In these examples, the user device 200 may display the links 260 for access mechanisms 202 having lower result scores 226 farther down the list e.g., off screen). In some examples, as illustrated in FIG. 2, the user device 200 groups together the links 260 associated with the same native application 204a.

Modules and data stores included in the search system 300, the entity system 400, and the advertisement system 500 represent features that may be included in the systems 300, 400, 500 of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

In some implementations, the systems 300, 400, 500 may be systems of one or more computing devices (e.g., a computer search system) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the systems 300, 400, 500 may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs). The data stores may include one or more storage devices (e.g., memory and/or hard disk devices).

The one or more computing devices of the systems 300, 400, 500 may be configured to communicate with the network 120. The one or more computing devices of the systems 300, 400, 500 may also be configured to communicate with one another (e.g., via a computer network). In some examples, the one or more computing devices of the systems 300, 400, 500 may include one or more server computing devices configured to communicate with user devices (e.g., receive query wrappers and transmit results), gather data from data sources 130, index data, store the data, and store other documents. The one or more computing devices may reside within a single machine at a single geographic location in some examples. In other examples, the one or more computing devices may reside within multiple machines at a single geographic location. In still other examples, the one or more computing devices of the systems 300, 400, 500 may be distributed across a number of geographic locations.

Figure 9:
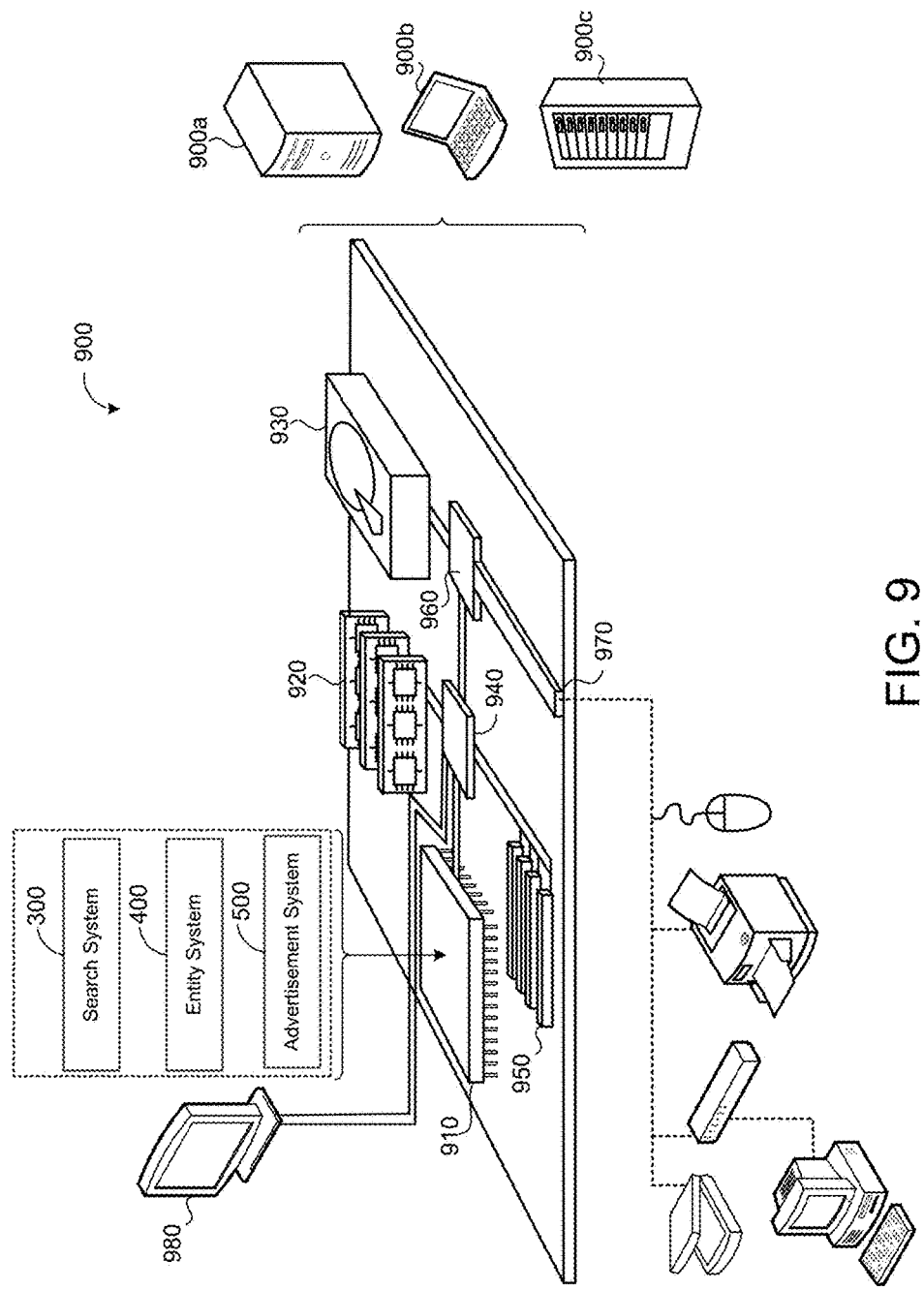
FIG. 9 is a schematic view of an example computing device executing any systems or methods described herein.

FIG. 9 is a schematic view of an example computing device 900 that may be used to implement the systems and methods described in this document. The computing device 900 is intended to represent various forms of digital computers, such as laptops, desktops, workstations, smartphones, tablets, servers, blade servers, mainframes, and other computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to low speed bus 970 and storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM) electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and low-speed expansion port 970. The low-speed expansion port 970, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Although operations may be depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:
1. A method comprising:
  generating, by at least one processor of a computing device, graphical user interfaces, wherein the graphical user interfaces include input fields for receiving inputs of advertisement data from a plurality of advertiser devices;

transmitting, by the at least one processor, the graphical user interfaces to the plurality of advertiser devices using a communication interface circuit of the computing device;

in response to the transmitting of the graphical user interfaces to the plurality of advertiser devices, receiving, by the at least one processor, the advertisement data from the plurality of advertiser devices using the communication interface circuit;

generating, by the at least one processor, a plurality of advertisement records in an advertisement data store based on the advertisement data received from the plurality of advertiser devices, wherein each of the plurality of advertisement records includes:
 an entity name associated with an advertisement,
 an action associated with the advertisement, and
 a bid price indicating an amount of money associated with the advertisement;

receiving, by the at least one processor, an advertisement request from a search system using the communication interface circuit, the advertisement request including the entity name and a first action which is a first function provided by an application identified through search results to be generated by the search system;

selecting, by the at least one processor, an advertisement record from among the plurality of advertisement records, based on user usage data provided by a user device, wherein the advertisement record includes the entity name indicated in the advertisement request and a second action which is a second function provided by the application;

generating, by the at least one processor, a combined advertisement result of the first action and the second action based on the selected advertisement record, wherein the combined advertisement result is to be included in a search result of the search results to be generated by the search system, and wherein the first action is previously designated to trigger inclusion of at least the second action of the application in the combined advertisement result before receiving the advertisement request from the search system; and transmitting, by the at least one processor, the combined advertisement result to the search system using the communication interface circuit.

2. The method of claim 1,
wherein each of the plurality of advertisement records further comprises advertisement content associated with an application state, and
wherein the method further comprises generating the combined advertisement result based on the advertisement content.

3. The method of claim 1,
wherein the method further comprises selecting a plurality of potential advertisement records in response to the advertisement request, and
wherein the selecting of the advertisement record further comprises selecting the advertisement record corresponding to one of the plurality of potential advertisement records.

4. The method of claim 3, wherein the selecting of the advertisement record from the plurality of potential advertisement records further comprises:
 generating an expected revenue value for each of the plurality of potential advertisement records; and
 selecting a potential advertisement record based on the expected revenue value of the potential advertisement record.

5. An apparatus comprising:
a memory;
a communication interface circuit; and
at least one processor configured to execute computer-readable instructions stored in the memory, the computer-readable instructions, when executed by the at least one processor, cause the at least one processor to:
 generate graphical user interfaces, wherein the graphical user interfaces include input fields for receiving inputs of advertisement data from a plurality of advertiser devices,
 transmit the graphical user interfaces to the plurality of advertiser devices using the communication interface circuit,
 in response to transmitting the graphical user interfaces to the plurality of advertiser devices, receive the advertisement data from the plurality of advertiser devices,
 generate a plurality of advertisement records in a data store based on the advertisement data received from the plurality of advertiser devices, wherein each of the plurality of advertisement records includes:
  an entity name associated with an advertisement,
  an action associated with the advertisement, and
  a bid price indicating an amount of money associated with the advertisement,
 receive an advertisement request from a search system, the advertisement request including the entity name and a first action which is a first function provided by an application identified through search results to be generated by the search system,
 select an advertisement record from among the plurality of advertisement records, based on user usage data provided by a user device, wherein the advertisement record includes the entity name indicated in the advertisement request and a second action which is a second function provided by the application,
 generate a combined advertisement result of the first action and the second action based on the selected advertisement record,
 wherein the combined advertisement result is to be included in a search result of the search results to be generated by the search system, and
 wherein the first action is previously designated to trigger inclusion of at least the second action of the application in the combined advertisement result before receiving the advertisement request from the search system, and
 transmit the combined advertisement result to the search system.

6. The apparatus of claim 5,
wherein the entity name of each of the plurality of advertisement records is associated with an application state,
wherein the action of each of the plurality of advertisement records is associated with the application state, and
wherein the bid price of each of the plurality of advertisement records is associated with the application state.

7. The apparatus of claim 5,
wherein each of the plurality of advertisement records further comprise advertisement targeting parameters that specify conditions for generating the advertisement, and wherein the at least one processor is further configured to select the advertisement record when contents of the advertisement request satisfy the advertisement targeting parameters.

8. The apparatus of claim 5,
wherein each of the plurality of advertisement records further comprise advertisement content associated with an application state, and
wherein the at least one processor is further configured to generate the combined advertisement result based on the advertisement content.

9. The apparatus of claim 5,
wherein the entity name and the first action of the advertisement request is a first entity-action pair,
wherein the advertisement request includes a plurality of additional entity-action pairs, and
wherein the at least one processor is further configured to:
select additional advertisement records for the plurality of additional entity-action pairs,
generate additional advertisement results for the additional advertisement records, and
transmit the additional advertisement results to the search system.

10. The apparatus of claim 5,
wherein the entity name and the first action of the advertisement request is a primary entity-action pair of a primary search result, and
wherein the at least one processor is further configured to:
receive a set of secondary entity-action pairs, each of the set of secondary entity-action pairs corresponding to a respective secondary search result,
select one of the set of secondary entity-action pairs, and
generate the combined advertisement result based on the selected one of the set of secondary entity-action pairs.

11. The apparatus of claim 5, wherein the at least one processor is further configured to:
select a plurality of potential advertisement records in response to the advertisement request, and
select an advertisement record corresponding to one of the plurality of potential advertisement records.

12. The apparatus of claim 11, wherein the at least one processor is further configured to:
generate an expected revenue value for each of the plurality of potential advertisement records, and
select the advertisement record based on the expected revenue value of a potential advertisement record.

13. The apparatus of claim 11, wherein the at least one processor is further configured to:
generate a percentage likelihood of a user selection of a user-selectable link corresponding to a potential advertisement record for each of the plurality of potential advertisement records, and
select the advertisement record based on the percentage likelihood of the user selection.

14. The apparatus of claim 11, wherein the at least one processor is further configured to:
generate a relevance score for each of the plurality of potential advertisement records, the relevance score indicating a relevance of a potential advertisement record to a search query included in the advertisement request, and
select the advertisement record based on the relevance score.

15. The apparatus of claim 11, wherein the at least one processor is further configured to:
retrieve a popularity score for each of the plurality of potential advertisement records, the popularity score indicating a popularity of an application state associated with the advertisement record, and
select the advertisement record based on the popularity score for the each of the plurality of potential advertisement records.

16. The apparatus of claim 5, wherein the bid price indicates the amount of money to be paid by an advertiser in exchange for display of the combined advertisement result.

17. The apparatus of claim 5, wherein the bid price indicates the amount of money to be paid by an advertiser in exchange for a user selection of a user-selectable link associated with the combined advertisement result.

18. A non-transitory machine-readable storage medium recording a program to perform a method of executing an operation of a computing device, the method comprising:
generating, by at least one processor of a computing device, graphical user interfaces, wherein the graphical user interfaces include input fields for receiving inputs of advertisement data from a plurality of advertiser devices;
transmitting, by the at least one processor, the graphical user interfaces to the plurality of advertiser devices using a communication interface circuit of the computing device;
in response to the transmitting of the graphical user interfaces to the plurality of advertiser devices, receiving, by the at least one processor, the advertisement data from the plurality of advertiser devices using the communication interface circuit;
generating, by the at least one processor, a plurality of advertisement records in an advertisement data store based on the advertisement data received from the plurality of advertiser devices, wherein each of the plurality of advertisement records includes:
an entity name associated with an advertisement,
an action associated with the advertisement, and
a bid price indicating an amount of money associated with the advertisement;
receiving, by the at least one processor, an advertisement request from a search system using the communication interface circuit, the advertisement request including the entity name and a first action which is a first function provided by an application identified through search results to be generated by the search system;
selecting, by the at least one processor, an advertisement record from among the plurality of advertisement records, based on user usage data provided by a user device, wherein the advertisement record includes the entity name indicated in the advertisement request and a second action which is a second function provided by the application;
generating, by the at least one processor, a combined advertisement result of the first action and the second action based on the selected advertisement record,
wherein the combined advertisement result is to be included in a search result of the search results to be generated by the search system, and
wherein the first action is previously designated to trigger inclusion of at least the second action of the application in the combined advertisement result before receiving the advertisement request from the search system; and
transmitting, by the at least one processor, the combined advertisement result to the search system using the communication interface circuit.

* * * * *